United States Patent
Hosseini et al.

(10) Patent No.: US 11,553,443 B2
(45) Date of Patent: Jan. 10, 2023

(54) POWER HEADROOM REPORTING PROCEDURE FOR MULTIPLE CELLS

(71) Applicant: QUALCOMM Incorporated, San Diego, CA (US)

(72) Inventors: Seyedkianoush Hosseini, San Diego, CA (US); Linhai He, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 16/731,017

(22) Filed: Dec. 30, 2019

(65) Prior Publication Data

US 2020/0213955 A1 Jul. 2, 2020

Related U.S. Application Data

(60) Provisional application No. 62/787,627, filed on Jan. 2, 2019.

(51) Int. Cl.
  *H04W 52/36* (2009.01)
  *H04W 72/04* (2009.01)
  (Continued)

(52) U.S. Cl.
  CPC ......... *H04W 52/365* (2013.01); *H04L 5/0094* (2013.01); *H04W 8/24* (2013.01);
  (Continued)

(58) Field of Classification Search
  CPC ..... H04W 52/365; H04W 52/34; H04W 8/24; H04W 72/042; H04W 72/0473;
  (Continued)

(56) References Cited

U.S. PATENT DOCUMENTS

2013/0028223 A1* 1/2013 Kim ................. H04W 72/0446
                                                      370/329
2018/0279339 A1 9/2018 Lohr et al.
(Continued)

OTHER PUBLICATIONS

Intel Corporation: "Determination of PH Value Type," 3GPP Draft, 3GPP TSG-RAN WG2 Meeting #104, R2-1816763, 3rd Generation Partnership Project (3GPP), Mobile Competence Centre, 650, Route Des Lucioles, F-06921, Sophia-Antipolis Cedex, France, vol. RAN WG2, No. Spokane, USA, Nov. 12, 2018-Nov. 16, 2018, Nov. 12, 2018 (Nov. 12, 2018), XP051556329, 3 pages, Retrieved from the Internet: URL: http://www.3gpp.org/ftp/Meetings%5F3GPP%5FSYNC/RAN2/Docs/R2%2D1816763%2Ezip [retrieved on Nov. 12, 2018], section 2, p. 1.

(Continued)

*Primary Examiner* — Joshua Kading
(74) *Attorney, Agent, or Firm* — Holland & Hart LLP

(57) ABSTRACT

Methods, systems, and devices for wireless communications are described. In some wireless communications systems, a device, such as a user equipment (UE), may report power headroom measurements. To support accurate and reliable power headroom reports (PHRs), the UE may receive a first downlink control information (DCI) transmission for a first cell and determine whether a second DCI transmission for a second cell is received. The UE may generate the PHR based on whether a second DCI transmission was received after the first DCI transmission and may transmit the PHR including power headroom values for both cells. The UE may determine whether to perform an actual or virtual power headroom calculation for the second cell based on when the second DCI was received. Additionally or alternatively, the UE may determine whether to drop resources scheduled by the first or second DCI and may transmit the PHR in the remaining resources.

30 Claims, 14 Drawing Sheets

(51) Int. Cl.
*H04W 72/10* (2009.01)
*H04W 8/24* (2009.01)
*H04L 5/00* (2006.01)

(52) U.S. Cl.
CPC ..... *H04W 72/042* (2013.01); *H04W 72/0473* (2013.01); *H04W 72/10* (2013.01)

(58) Field of Classification Search
CPC .... H04W 72/10; H04W 24/10; H04L 5/0094; H04L 5/0053; H04L 5/001
See application file for complete search history.

(56) References Cited

U.S. PATENT DOCUMENTS

| | | | |
|---|---|---|---|
| 2019/0230605 A1* | 7/2019 | Wang | H04W 72/0446 |
| 2019/0239171 A1* | 8/2019 | Ahn | H04W 72/12 |
| 2019/0268861 A1* | 8/2019 | Takeda | H04W 24/10 |
| 2020/0100194 A1* | 3/2020 | Nangia | H04W 72/0453 |
| 2020/0288412 A1* | 9/2020 | Ajdakple | H04W 52/367 |
| 2020/0296673 A1* | 9/2020 | Ouchi | H04W 52/281 |
| 2021/0045071 A1* | 2/2021 | Maki | H04B 7/0426 |
| 2021/0410079 A1* | 12/2021 | MolavianJazi | H04W 52/367 |

OTHER PUBLICATIONS

International Search Report and Written Opinion—PCT/US2019/069086—ISA/EPO—dated Apr. 1, 2020.
Lenovo, et al., "PHR MAC CE Format," 3GPP TSG-RAN WG2 Meeting #100, 3GPP Draft, R2-1712916, 3rd Generation Partnership Project (3GPP), Mobile Competence Centre, 650, Route Des Lucioles, F-06921, Sophia-Antipolis Cedex, France, vol. RAN WG2, No. Reno, USA; Nov. 27, 2017-Dec. 1, 2017, Nov. 16, 2017 (Nov. 16, 2017), XP051371068, 3 Pages, Retrieved from the Internet: URL: https://www.3gpp.org/ftp/tsg_ran/WG2_RL2/TSGR2_100/Docs/[retrieved on Nov. 16, 2017], section 2.
Nokia, et al., "PHR Timing for Configured Grant," 3GPP Draft, 3GPP TSG-RAN WG2 Meeting #103bis, R2-1814473, PHR Timing for Configured Grant, 3rd Generation Partnership Project (3GPP), Mobile Competence Centre, 650, Route Des Lucioles, F-06921, Sophia-Antipolis Cedex, France, vol. RAN WG2, No. Chengdu, China; Oct. 8, 2018-Oct. 12, 2018, Sep. 28, 2018 (Sep. 28, 2018), XP051523900, 2 pages, Retrieved from the Internet: URL:http://www.3gpp.org/ftp/tsg%5Fran/WG2%5FRL2/TSGR2%5F103bis/Docs/R2%2D1814473%2Ezip [retrieved on Sep. 28, 2018], section 2, p. 1-p. 2.

\* cited by examiner

POWER HEADROOM REPORTING PROCEDURE FOR MULTIPLE CELLS

CROSS REFERENCE

The present application for patent claims the benefit of U.S. Provisional Patent Application No. 62/787,627 by HOSSEINI, et al., entitled "POWER HEADROOM REPORTING PROCEDURE FOR MULTIPLE CELLS," filed Jan. 2, 2019, assigned to the assignee hereof, and expressly incorporated by reference in its entirety herein.

BACKGROUND

The following relates generally to wireless communications, and more specifically to a power headroom reporting procedure for multiple cells.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support power headroom reporting procedures for multiple cells. Generally, the described techniques provide for a user equipment (UE) to accurately and reliably report power headroom measurements for multiple cells in at least one power headroom report (PHR). In some wireless communications systems, UEs may report power headroom measurements to base stations based on one or more triggers or conditions (e.g., periodic timers, prohibit timers, or some combination of these or other configured timers or triggers). As one example, a UE may receive a first downlink control information (DCI) transmission for a first cell and may determine whether a second DCI transmission is received for a second cell after the first DCI. The UE may generate a PHR including power headroom measurements for multiple cells (e.g., the first and second cells) based on whether the second DCI transmission was received and may transmit the PHR in uplink resources.

In some cases, the UE may determine whether to perform an actual or virtual power headroom calculation for the second cell based on when the second DCI was received. For example, if the UE receives the second DCI after the first DCI but before a PHR reference time that is based on UE processing capabilities and the uplink resources for power headroom reporting, the UE may perform a relatively accurate calculation of the power headroom for the second cell based on the received second DCI (e.g., due to the adequate time for processing). Additionally or alternatively, the UE may determine whether to drop first resources scheduled by the first DCI or second resources scheduled by the second DCI if the two sets of resources partially or fully overlap in time, and the UE may transmit the PHR for both cells in the resources that were not dropped. This may improve the reliability of transmitting the PHR in cases with overlapping resource allocations.

A method for wireless communications by a UE is described. The method may include identifying a trigger for transmitting a PHR, receiving first DCI indicating first uplink resources for a first cell, determining whether second DCI indicating second uplink resources for a second cell is received after receiving the first DCI and before the first uplink resources, and transmitting the PHR including a first power headroom for the first cell and a second power headroom for the second cell, where the PHR is based on the determining.

An apparatus for wireless communications by a UE is described. The apparatus may include a processor, memory in electronic communication with the processor, and instructions stored in the memory. The instructions may be executable by the processor to cause the apparatus to identify a trigger for transmitting a PHR, receive first DCI indicating first uplink resources for a first cell, determine whether second DCI indicating second uplink resources for a second cell is received after receiving the first DCI and before the first uplink resources, and transmit the PHR including a first power headroom for the first cell and a second power headroom for the second cell, where the PHR is based on the determining.

Another apparatus for wireless communications by a UE is described. The apparatus may include means for identifying a trigger for transmitting a PHR, receiving first DCI indicating first uplink resources for a first cell, determining whether second DCI indicating second uplink resources for a second cell is received after receiving the first DCI and before the first uplink resources, and transmitting the PHR including a first power headroom for the first cell and a second power headroom for the second cell, where the PHR is based on the determining.

A non-transitory computer-readable medium storing code for wireless communications by a UE is described. The code may include instructions executable by a processor to identify a trigger for transmitting a PHR, receive first DCI indicating first uplink resources for a first cell, determine whether second DCI indicating second uplink resources for a second cell is received after receiving the first DCI and before the first uplink resources, and transmit the PHR including a first power headroom for the first cell and a second power headroom for the second cell, where the PHR is based on the determining.

Some examples of the method, apparatuses, and non-transitory computer-readable medium described herein may further include operations, features, means, or instructions for calculating the first power headroom based on a transmit power indicated by the first DCI, where the PHR is based on calculating the first power headroom.

Some examples of the method, apparatuses, and non-transitory computer-readable medium described herein may further include operations, features, means, or instructions for determining whether the second DCI is received before a PHR reference time that may be based on a power headroom processing timeline for the first cell and an initial symbol of the first uplink resources and calculating the second power headroom based on the determining whether the second DCI may be received before the PHR reference time, where the PHR is based on calculating the second power headroom.

Some examples of the method, apparatuses, and non-transitory computer-readable medium described herein may further include operations, features, means, or instructions for receiving the second DCI after receiving the first DCI and before the PHR reference time and calculating the second power headroom based on a transmit power indicated by the second DCI, where the PHR is based on calculating the second power headroom.

Some examples of the method, apparatuses, and non-transitory computer-readable medium described herein may further include operations, features, means, or instructions for determining that the second DCI is not received after the first DCI and before the PHR reference time, where calculating the second power headroom may be based on determining that the second DCI is not received.

Some examples of the method, apparatuses, and non-transitory computer-readable medium described herein may further include operations, features, means, or instructions for calculating the second power headroom using a virtual calculation that may be based on one or more pre-configured parameters, one or more parameters indicated by the first DCI, or a combination thereof, where the PHR may be based on calculating the second power headroom.

Some examples of the method, apparatuses, and non-transitory computer-readable medium described herein may further include operations, features, means, or instructions for calculating the second power headroom based on a transmit power for previous uplink resources for the second cell, where the previous uplink resources were scheduled before receiving the first DCI, and where the PHR may be based on calculating the second power headroom.

Some examples of the method, apparatuses, and non-transitory computer-readable medium described herein may further include operations, features, means, or instructions for calculating the second power headroom based on a transmit power for a previous grant-free uplink opportunity or a next grant-free uplink opportunity for the second cell, where the previous grant-free uplink opportunity was scheduled before receiving the first DCI and the next grant-free uplink opportunity is scheduled after receiving the first DCI, and where the PHR may be based on calculating the second power headroom.

Some examples of the method, apparatuses, and non-transitory computer-readable medium described herein may further include operations, features, means, or instructions for receiving the second DCI after the PHR reference time, where determining that the second DCI is not received after the first DCI and before the PHR reference time may be based on receiving the second DCI after the PHR reference time.

In some examples of the method, apparatuses, and non-transitory computer-readable medium described herein, the power headroom processing timeline for the first cell may be based on a UE processing capability for the first cell, a subcarrier spacing (SCS) for the first cell, or a combination thereof. Some examples of the method, apparatuses, and non-transitory computer-readable medium described herein may further include operations, features, means, or instructions for transmitting a report indicating the UE processing capability for the first cell, the SCS for the first cell, or a combination thereof.

Some examples of the method, apparatuses, and non-transitory computer-readable medium described herein may further include operations, features, means, or instructions for receiving the second DCI after receiving the first DCI and before the first uplink resources, where the first uplink resources at least partially overlap with the second uplink resources indicated by the second DCI, and dropping at least a portion of resources from either the first uplink resources or the second uplink resources based on the partial overlap, where the PHR may be transmitted in either the first uplink resources or the second uplink resources based on the dropping.

In some examples of the method, apparatuses, and non-transitory computer-readable medium described herein, a first priority value for the first uplink resources is different than a second priority value for the second uplink resources. Some examples of the method, apparatuses, and non-transitory computer-readable medium described herein may further include operations, features, means, or instructions for determining whether to drop the portion of resources from the first uplink resources or the second uplink resources based on at least one of the first priority value or the second priority value, where the portion of resources may be dropped from the first uplink resources if the first priority value is less than the second priority value and the portion of resources may be dropped from the second uplink resources if the first priority value is greater than the second priority value.

In some examples of the method, apparatuses, and non-transitory computer-readable medium described herein, a first priority value for the first uplink resources is equal to a second priority value for the second uplink resources. Some examples of the method, apparatuses, and non-transitory computer-readable medium described herein may further include operations, features, means, or instructions for determining whether to drop the portion of resources from the first uplink resources or the second uplink resources based on a pre-configuration, where dropping at least the portion of resources from either the first uplink resources or the second uplink resources may be based on determining whether to drop the portion of resources from the first uplink resources or the second uplink resources.

In some examples of the method, apparatuses, and non-transitory computer-readable medium described herein, the PHR may be transmitted in the second uplink resources based on the dropping. Some examples of the method, apparatuses, and non-transitory computer-readable medium described herein may further include operations, features, means, or instructions for calculating the first power headroom based on a transmit power indicated by the first DCI and calculating the second power headroom based on a transmit power indicated by the second DCI.

In some examples of the method, apparatuses, and non-transitory computer-readable medium described herein, the PHR may be transmitted in the second uplink resources based on the dropping. Some examples of the method, apparatuses, and non-transitory computer-readable medium described herein may further include operations, features, means, or instructions for calculating the first power headroom using a virtual calculation, where the virtual calculation may be based on one or more pre-configured parameters, one or more parameters indicated by the second DCI, or a combination thereof, and calculating the second power headroom based on a transmit power indicated by the second DCI.

In some examples of the method, apparatuses, and non-transitory computer-readable medium described herein, the PHR may be transmitted in the second uplink resources based on the dropping. Some examples of the method, apparatuses, and non-transitory computer-readable medium described herein may further include operations, features, means, or instructions for determining whether to re-calculate the first power headroom based on a power headroom processing timeline for the first cell and an initial symbol of the second uplink resources.

In some examples of the method, apparatuses, and non-transitory computer-readable medium described herein, transmitting the PHR may include operations, features, means, or instructions for transmitting the PHR in an initial transmission of a transport block (TB). Some examples of the method, apparatuses, and non-transitory computer-readable medium described herein may further include operations, features, means, or instructions for determining whether to transmit the PHR in the first uplink resources or the second uplink resources based on whether the first uplink resources or the second uplink resources correspond to the initial transmission of the TB. In some examples of the method, apparatuses, and non-transitory computer-readable medium described herein, the first uplink resources and the second uplink resources correspond to re-transmissions of TBs, where transmitting the PHR may include operations, features, means, or instructions for transmitting the PHR in third uplink resources corresponding to the initial transmission of the TB.

In some examples of the method, apparatuses, and non-transitory computer-readable medium described herein, identifying the trigger for transmitting the PHR may include operations, features, means, or instructions for identifying that a PHR prohibit timer has expired and determining that a current path loss for at least one cell differs from a reference path loss for the at least one cell by more than a path loss change threshold, where the reference path loss corresponds to a most recent PHR transmission for the at least one cell.

In some examples of the method, apparatuses, and non-transitory computer-readable medium described herein, identifying the trigger for transmitting the PHR may include operations, features, means, or instructions for identifying that a PHR periodic timer has expired.

Some examples of the method, apparatuses, and non-transitory computer-readable medium described herein may further include operations, features, means, or instructions for maintaining the identified trigger upon receiving the first DCI and canceling the identified trigger based on transmitting the PHR. Some examples of the method, apparatuses, and non-transitory computer-readable medium described herein may further include operations, features, means, or instructions for starting a PHR prohibit timer upon cancelling the identified trigger.

In some examples of the method, apparatuses, and non-transitory computer-readable medium described herein, the first cell corresponds to a first processing timeline and the second cell corresponds to a second processing timeline that is shorter than the first processing timeline.

DETAILED DESCRIPTION

Figure 1:
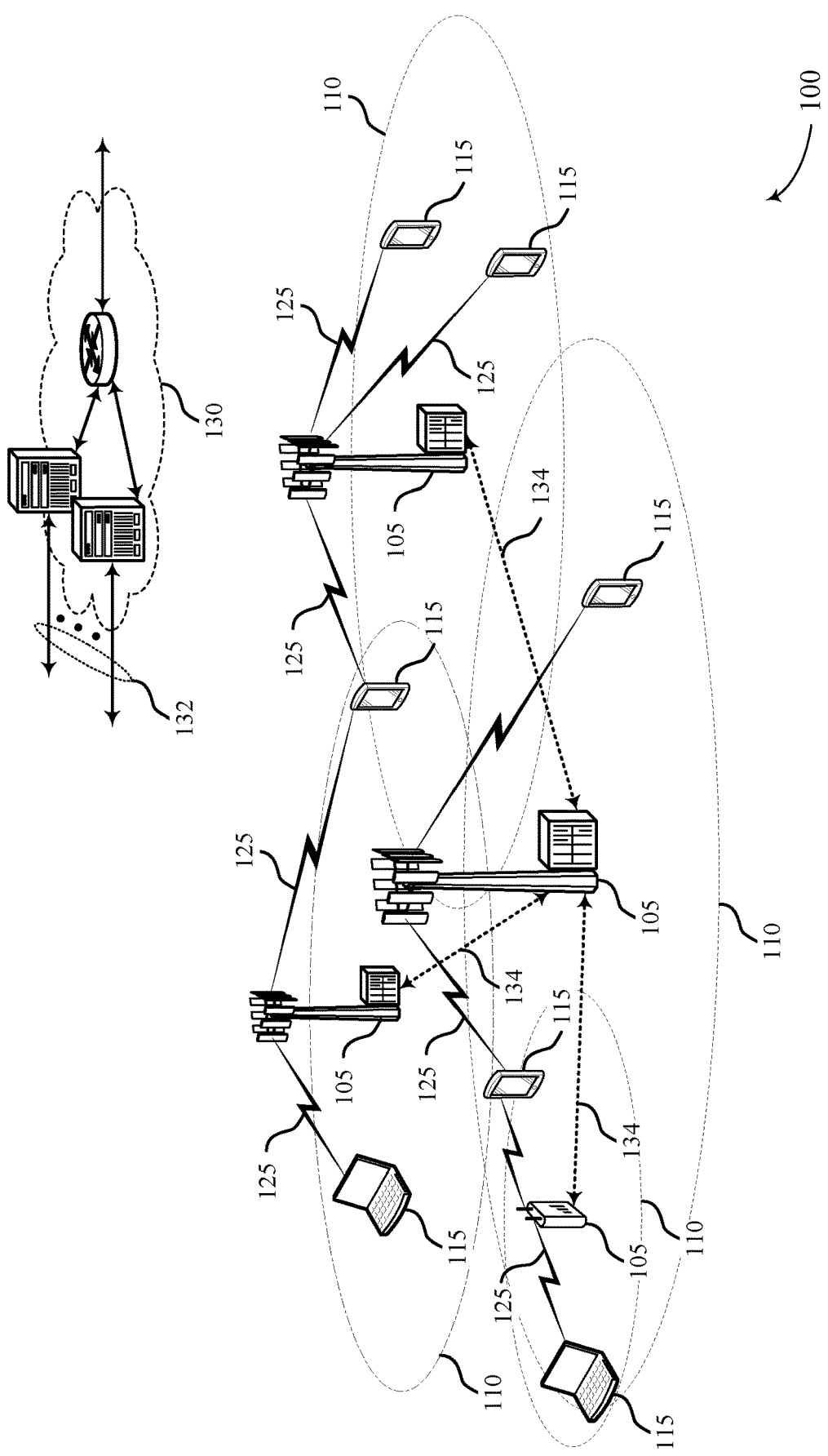
FIGS. 1 and 2 illustrate examples of wireless communications systems that support a power headroom reporting procedure for multiple cells in accordance with aspects of the present disclosure.

In some wireless communications systems (e.g., enhanced ultra-reliable low-latency communication (eURLLC) systems), a user equipment (UE) may transmit a power headroom report (PHR) to a base station to indicate an amount of transmit power remaining for the UE to use in addition to the current transmit power being used by the UE. In some cases, the UE may indicate separate power headroom values for different cells serving the UE. However, the UE may perform virtual power headroom calculations for one or more of the cells, which may be less accurate than power headroom calculations based on downlink control information (DCI). Additionally, if the UE is scheduled for uplink transmissions for multiple cells in overlapping resources (e.g., overlapping in time), the UE may fully or partially drop resources for one or more of the cells. In some cases, this dropping of resources may result in the UE dropping one or more scheduled PHR transmissions, which may increase the latency involved in reporting power headroom values. As such, power headroom reporting for multiple cells may be inaccurate for certain cells and may be unreliable in cases of overlapping resource assignments.

In some configurations, a UE may report power headroom measurements that may be different for distinct cells, where the UE may include the different power headroom measurements in a shared PHR. The base station receiving the PHR may use the reported power headroom measurements to estimate an uplink bandwidth for the UE per cell (e.g., in a particular subframe), where the bandwidth may depend in some cases on the available power headroom.

The UE may transmit the PHR based on one or more configured PHR triggers for or conditions related to the UE (e.g., periodic timers, prohibit timers, or some combination of these or other configured timers or triggers). When power headroom reporting is triggered, in some examples, the UE may determine to transmit a PHR in uplink resources, such as the next available uplink resources. The UE may receive a first DCI transmission for a first cell scheduling a first set of uplink resources for the UE, and the UE may perform (e.g., may initiate) power headroom calculations based on the DCI. For example, the UE may calculate the power headroom for the first cell using the transmit power indicated in the DCI for the first set of uplink resources. In some cases, the UE may perform one or more virtual calculations to determine power headroom measurements for one or more other cells serving the UE (e.g., based on pre-configured values or parameters in the DCI for the first cell).

Additionally or alternatively, the UE may perform power headroom calculations for the one or more other cells using transmit powers for previously or subsequently scheduled uplink resources or for grant-free uplink resources.

To improve the accuracy of one or more of these power headroom calculations, the UE may determine a PHR reference time for updating power headroom calculations. This PHR reference time may be based on processing capabilities of the UE and the first symbol of the scheduled uplink resources. If the UE receives an additional DCI transmission from another cell after receiving the first DCI but before the PHR reference time, the UE may determine that it has sufficient time to perform an updated calculation for the power headroom of that cell. The UE may calculate the power headroom for this other cell using the transmit power indicated in the additional DCI. Using this DCI-based power headroom calculation may improve the accuracy of the power headroom measurement for the additional cell.

Additionally or alternatively, for improved PHR transmission reliability, the UE may transmit the PHR—including power headroom measurements for multiple cells—in different sets of resources. For example, if the first set of uplink resources and a second set of uplink resources scheduled for the UE overlap (e.g., in time), the UE may fully or partially drop one of the resource sets to avoid collisions. But the UE may transmit the PHR in either of the resource sets, such that dropping one resource set does not result in the UE dropping the PHR transmission. These power headroom reporting techniques may improve accuracy and reliability of power headroom reporting for multiple cells.

Aspects of the disclosure are initially described in the context of wireless communications systems. Additional aspects of the disclosure are described with reference to power headroom reporting timelines and process flows. Aspects of the disclosure are further illustrated by and described with reference to apparatus diagrams, system diagrams, and flowcharts that relate to a power headroom reporting procedure for multiple cells.

FIG. 1 illustrates an example of a wireless communications system 100 that supports a power headroom reporting procedure for multiple cells in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide re-transmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support re-transmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and re-transmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30{,}720{,}000$ seconds. Time intervals of a communications resource may be organized according to radio frames each having a duration of 10 milliseconds (ms), where the frame period may be expressed as $T_f = 307{,}200\, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100 (e.g., eURLLC systems), a UE 115 may report power headroom measurements to a base station 105 for one or more cells serving the UE 115. In some configurations, the UE 115 may report different power headroom measurements for different cells, and the UE 115 may include the different power headroom measurements in a single PHR. The base station 105 receiving the PHR may use the reported power headroom measurements to estimate an uplink bandwidth for the UE 115 per cell, where the bandwidth may depend on the indicated power headroom.

A UE 115 may transmit a PHR based on one or more configured PHR triggers for the UE 115. When power headroom reporting is triggered (e.g., at the UE 115), the UE 115 may determine to transmit a PHR (e.g., in next available uplink resources). The UE 115 may receive a first DCI transmission for a first cell (e.g., from a base station 105) scheduling a first set of uplink resources for the UE 115, and the UE 115 may initiate power headroom calculations based on the DCI. For example, the UE 115 may calculate the power headroom for the first cell using the transmit power indicated in the DCI for the first set of uplink resources. In some cases, the UE 115 may perform a number of calculations, such as virtual calculations, to determine power headroom measurements for other cells serving the UE 115 (e.g., based on pre-configured values or parameters in the DCI for the first cell). Additionally or alternatively, the UE 115 may perform power headroom calculations for the other cells using transmit powers for previously scheduled uplink resources, transmit powers for grant-free uplink resources, or the like.

To improve the accuracy of one or more of these power headroom calculations, the UE 115 may determine a PHR reference time (e.g., a DCI reception deadline) for updating power headroom calculations. This PHR reference time may be based on processing capabilities of the UE 115 and the first symbol of the scheduled uplink resources. If the UE 115 receives an additional DCI transmission from another cell (e.g., from the same or a different base station 105) after receiving the first DCI but before the PHR reference time, the UE 115 may determine that it has sufficient time to perform an updated calculation for the power headroom of that cell. The UE 115 may calculate the power headroom for this other cell using the transmit power indicated in the additional DCI. Using this DCI-based power headroom calculation may improve the accuracy of the power headroom measurement for the additional cell.

Additionally or alternatively, for improved PHR transmission reliability, the UE 115 may switch (e.g., dynamically switch) the uplink resources for transmitting the PHR to improve the likelihood that the PHR is transmitted in a timely manner. For example, if the first set of uplink resources and a second set of uplink resources scheduled for the UE 115 overlap (e.g., in time), the UE 115 may fully or partially drop one of the resource sets (e.g., based on a priority of each resource set). The UE 115 may transmit the PHR in either of the resource sets, however, such that dropping one resource set does not result in the UE 115 refraining from transmitting the PHR transmission. These power headroom reporting techniques may improve the accuracy and reliability of a UE 115 reporting power headroom measurements for multiple cells.

Figure 2:
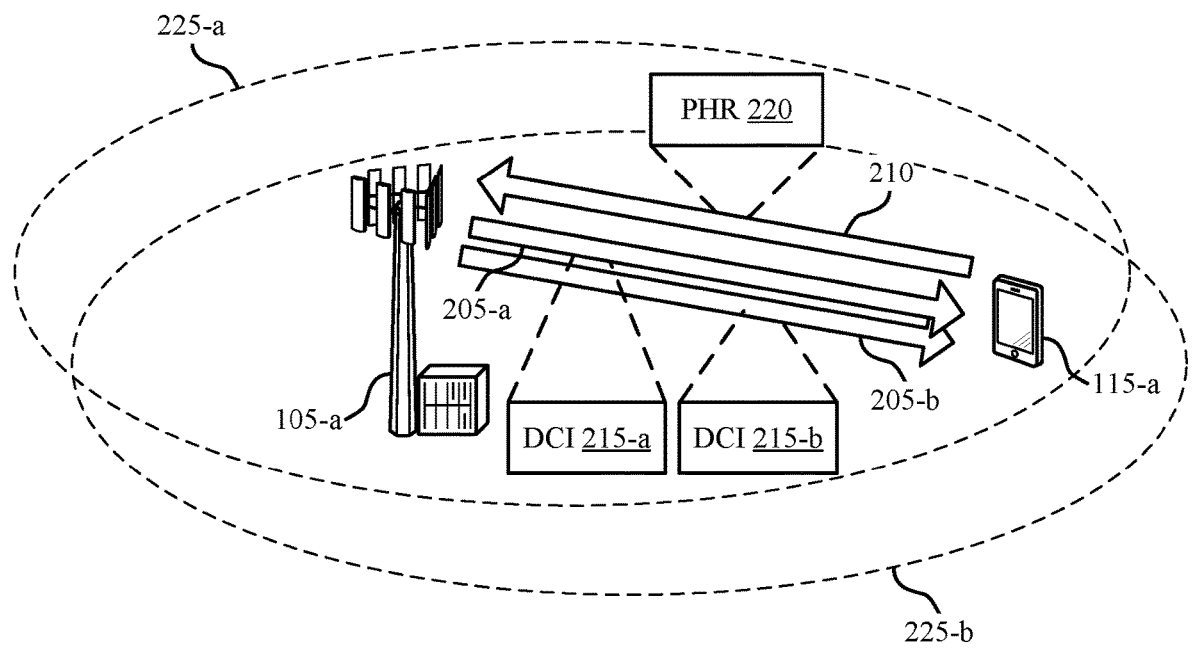

FIG. 2 illustrates an example of a wireless communications system 200 that supports a power headroom reporting procedure for multiple cells in accordance with aspects of the present disclosure. The wireless communications system 200 may include base station 105-a and UE 115-a, which may be examples of the corresponding devices described with reference to FIG. 1. Base station 105-a may support a first cell 225-a and a second cell 225-b, where each of these cells 225 may serve at least UE 115-a. Alternatively, separate base stations 105 may support the first cell 225-a and the second cell 225-b, where the separate base stations 105 may be linked via backhaul. In some cases, UE 115-a may transmit a PHR 220 containing power headroom measurements for both cell 225-a and cell 225-b.

Power headroom generally relates to a measurement of the available transmission power left to a UE 115 (e.g., in addition to a current transmission power used by the UE 115 for a current transmission). A UE 115 may support multiple types of power headroom measurements. For example, Type 1 power headroom may refer to the difference between the nominal UE maximum transmit power and the estimated current transmit power (e.g., the transmit power for uplink-shared channel (SCH) transmissions per activated serving cell).

Type 2 power headroom may refer to the difference between the nominal UE maximum transmit power and the estimated power for uplink-SCH and physical uplink control channel (PUCCH) transmissions on another MAC entity cell (e.g., a special cell, a serving cell, etc.). In Type 2 power headroom, in the case of E-UTRA NR dual connectivity (EN-DC), this other MAC entity may be an E-UTRA MAC entity.

Type 3 power headroom may refer to the difference between the nominal UE maximum transmit power and the estimated power for sounding reference signal (SRS) transmissions per activated serving cell. In some cases, additional or alternative types of power headroom measurements may be defined for a system. In a power headroom reporting procedure, a UE 115 (e.g., UE 115-a) may transmit a PHR 220 to a serving base station 105 (e.g., base station 105-a) to indicate power headroom information, such as one or more of these types of power headroom measurements. A PHR 220 may be an example of a MAC control element (CE) and may be transmitted in a physical uplink shared channel (PUSCH) transmission.

When power headroom reporting is triggered, the UE 115-a may calculate one or more power headroom measurements to include in a PHR 220 for transmission to base station 105-a. For example, a power headroom measurement (e.g., Type 1 power headroom) may correspond to the UE maximum available transmission power minus the power scheduled for PUSCH transmission, as described below in Equation 1:

$$\text{Power headroom} = \text{UE maximum transmission power} - \text{PUSCH power} \quad (1)$$

UE 115-a may calculate the power headroom based on information included in DCI 215 received from base station 105-a. A DCI 215 transmission may allocate uplink resources (e.g., PUSCH resources) to the UE 115 and may indicate a scheduled transmit power for the UE 115 to implement in the scheduled PUSCH resources. The UE 115 may then transmit a PHR 220 to the base station 105 and may include the calculated power headroom value(s) in the PHR 220.

A PHR 220 may be triggered in a variety of ways, including, but not limited to, different conditions. In one example, the PHR 220 may be triggered if a periodic timer expires (e.g., phr-PeriodicTimer). This may maintain a maximum temporal gap between PHRs 220 for UE 115-a (e.g., where the maximum gap corresponds to the reset value configured for the periodic timer).

In another example, the PHR may be triggered if a prohibit timer (e.g., phr-ProhibitTimer) expires and if a path loss for a path loss reference cell has changed by more than a threshold. In this example, the prohibit timer may trigger PHR 220 transmission whether the prohibit timer expires before the pathloss difference satisfies the threshold or after the pathloss difference satisfies the threshold. The pathloss change threshold value may be defined as a phr-Tx-Power-FactorChange threshold and, in some cases, may be measured in decibels (dBs). UE 115-a may check a pathloss difference for each activated serving cell 225 for any MAC entity operating as a pathloss reference that has uplink resources allocated for a new transmission. If at least one of these activated serving cells 225 has a pathloss change greater than the threshold value since the last transmission of a PHR 220 in the corresponding MAC entity and the prohibit timer has expired, a PHR 220 transmission may be triggered at UE 115-a.

Specifically, the pathloss variation for one of the serving cells 225 may correspond to the difference between the pathloss measured at a current time on a first current pathloss reference cell and the pathloss measured at the transmission time of a previous (e.g., the last) transmission of PHR 220 for a second pathloss reference cell used at that time. The pathloss reference cell may be a first cell 225 for the measurement at a first time (e.g., the present time) and may be a second cell 225 for the measurement at a second time (e.g., the transmission time), or the pathloss reference cell may be the same cell 225 at both times.

In such an example of using a prohibit timer to trigger PHR 220, once a first PHR 220 has been triggered or transmitted, the PHR 220 may not be triggered again until the prohibit timer expires. The prohibit timer may allow UE 115-a to send PHRs 220 at shorter intervals than the periodic timer in cases where a pathloss measurement has changed drastically (e.g., more than the threshold value). The periodic timer and prohibit timer are two examples of possible triggers for PHR 220 transmission. However, additional or alternative triggers and/or timers may be implemented by UE 115-a to trigger PHR 220 transmissions to base station 105-a.

UE 115-a may be configured (e.g., base station 105-a may configure UE 115-a) to calculate one or more power headroom measurements for the configured uplink cells 225. In a first example, UE 115-a may be configured in a "single" configuration (e.g., singlePHR mode or a single entry PHR format). In the single configuration, if power headroom reporting is triggered, UE 115-a may calculate the power headroom and transmit a PHR 220 for one cell 225 (e.g., the primary cell (PCell) for UE 115-a, such as cell 225-a).

In a second example, UE 115-a may be configured in a "multiple" configuration (e.g., multiplePHR mode). In the multiple configuration case, if power headroom reporting is triggered for even one cell 225, UE 115-a may report the PHR 220 including the power headroom for multiple (e.g., all) configured uplink cells 225 of the MAC entity (e.g., cells 225-a and 225-b). Whether UE 115-a is configured for single PHR 220 (e.g., a PHR 220 containing a single power headroom measurement) or multiple PHRs 220 (e.g., a PHR 220 containing multiple power headroom measurements) may be determined by base station 105-a. Base station 105-a may transmit an indication of at least one configuration (e.g., single or multiple PHR configuration) to UE 115-a, and UE 115-a may operate according to the signaled configuration.

In some systems, a UE 115 may be configured to include multiple power headroom measurements in a same PHR. The UE 115 may calculate power headroom values for multiple cells and may transmit a PHR (e.g., a Type 1 PHR) to one or more base stations 105, where the PHR includes the power headroom values for the multiple cells. The UE 115, however, may perform one or more "virtual" computations for the power headroom calculations for the multiple cells, limiting the accuracy of the power headroom measurements.

For example, the UE 115 may calculate a first power headroom measurement based on an assigned transmit power for a first PUSCH resource set, where the assigned transmit power may be indicated in a first received DCI. This first PUSCH resource set may correspond to an initial transmission of a first transport block (TB) on a first active uplink bandwidth part (BWP) of a first carrier for a first serving cell. The UE 115 may also receive a second DCI scheduling a second PUSCH transmission on a second active BWP of a second carrier for a second serving cell, where the second DCI may indicate a transmit power for the second PUSCH transmission. The second PUSCH resources may overlap (e.g., in time) with the first PUSCH resources. If this second DCI is received after the first DCI, the UE may not consider the transmit power indicated in the second DCI when calculating the power headroom for this second cell.

For example, if the second DCI corresponds to a first DCI format (e.g., DCI format 0_0 or 0_1) in a physical downlink control channel (PDCCH) received in a second PDCCH monitoring occasion, and if the second PDCCH monitoring occasion occurs after the first PDCCH monitoring occasion where the UE 115 detects the earliest DCI format (e.g., 0_0 or 0_1) scheduling an initial transmission of a TB after a PHR transmission was triggered, the second DCI may not affect the power headroom calculation. That is, the first DCI following the PHR trigger may initiate the power headroom calculations for the PHR for each of the cells, so DCI received after this first DCI may not be used for the already in progress power headroom calculations.

In these cases (e.g., if a first DCI is received in a first monitoring occasion for a first cell, initiating power headroom calculations for multiple cells), power headroom calculations for additional cells beyond the first cell may be performed based on a virtual calculation, as opposed to "actual" calculations that take currently assigned DCI transmit powers into account. A virtual calculation of the power headroom may involve, in some examples, the UE 115 determining an estimate of the power headroom for a cell based on pre-configured values or parameters in the DCI for a different cell (e.g., where the UE 115 estimates a transmit power for the cell). In some cases, the estimation of the transmit power may be based on a reference PUSCH or a grant-free PUSCH, rather than a currently scheduled PUSCH. An actual calculation of power headroom may involve, in some examples, the UE 115 subtracting the actual transmit power indicated in a DCI transmission for PUSCH resources from the maximum available transmission power of the UE 115.

In some cases, PUSCH resources for different cells may overlap in time for such systems. If the UE 115 does not support simultaneous or concurrent transmissions in multiple PUSCH resource sets, the UE 115 may fully or partially drop one or more of the resource sets. If the PHR is scheduled for transmission in the first PUSCH based on the received DCI in the first PDCCH monitoring occasion and the UE 115 drops resources from the first PUSCH, the UE 115 may fail to send the PHR to the base station 105. This issue may be even more severe if the second PUSCH resources are associated with a packet with a relatively higher priority than a packet associated with the first PUSCH resources.

For example, the second PUSCH resources may correspond to ultra-reliable low-latency communication (URLLC) transmissions while the first PUSCH resources may correspond to eMBB transmissions. For the base station 105 to support URLLC, the base station 105 may use accurate power headroom information received in a timely manner (e.g., within some threshold response time). If the PHR transmission is dropped based on dropping the first PUSCH resources, the base station 105 may fail to adequately support URLLC reception due to not receiving the power headroom measurements. As such, these systems may result in inaccurate power headroom measurements for certain cells, as well as slow power headroom reporting in cases where PUSCH resources with a scheduled PHR are dropped.

In contrast, wireless communications system 200 may support one or more operations for improved power headroom reporting for multiple cells 225. UE 115-a may identify a trigger to transmit a PHR 220 (e.g., based on a PHR timer). Based on the PHR trigger, UE 115-a may determine to transmit a PHR 220 in next available uplink resources. UE 115-a may receive a first DCI 215-a transmission for a first cell 225-a (e.g., from base station 105-a) over a first carrier 205-a. This first DCI 215-a may schedule a first set of uplink resources (e.g., PUSCH resources) for UE 115-a, and UE 115-a may initiate power headroom calculations based on the first DCI 215-a. For example, UE 115-a may calculate the power headroom for the first cell 225-a using the transmit power indicated in the first DCI 215-a for the first set of uplink resources. In some cases, UE 115-a may perform a number of calculations (e.g., virtual calculations) to determine power headroom measurements for other cells 225 serving the UE 115-a (e.g., second cell 225-b).

In a first operation, to improve the accuracy of one or more of these power headroom calculations, UE 115-a may determine a PHR reference time (e.g., a DCI 215 reception deadline) for updating power headroom calculations. This PHR reference time may be based on processing capabilities of UE 115-a and the first symbol of the scheduled uplink resources. If UE 115-a receives additional DCI 215-b (e.g., from another cell 225-b) over a second carrier 205-b (e.g., from the same or a different base station 105) after receiving the first DCI 215-a and before the PHR reference time, UE 115-a may determine whether it has sufficient time to perform an updated calculation for the power headroom of the second cell 225-b. UE 115-a may calculate the power headroom for this second cell 225-b using the transmit power indicated in the second DCI 215-b. Using this DCI-based power headroom calculation may improve the accuracy of the power headroom measurement for the additional cell 225-b. UE 115-a may transmit one or more PHRs 220 containing the power headroom measurements for at least the first cell 225-a and the second cell 225-b on an uplink channel 210 to base station 105-a using scheduled uplink resources (e.g., a PUSCH resource set scheduled by the first DCI 215-a or the second DCI 215-b).

Additionally or alternatively, in an operation, UE 115-a may improve the PHR transmission reliability by supporting switching of the uplink resources for transmitting the PHR 220 to improve the likelihood that the PHR 220 is transmitted in a timely manner. For example, if the first set of uplink resources scheduled by DCI 215-a and the second set of uplink resources scheduled by DCI 215-b for UE 115-a overlap in time, UE 115-a may fully or partially drop one of the resource sets (e.g., based on a priority of at least one of the resource sets). But UE 115-a may transmit the PHR 220 in either of the resource sets, such that dropping one resource set does not result in UE 115-a refraining from transmitting the PHR 220 transmission in at least one of the scheduled PUSCH resource sets. In this way, UE 115-a may transmit the PHR 220 in either the first uplink resources or the second uplink resources. Base station 105-a may receive the PHR 220 and may support URLLC operation based on the received power headroom measurements for the first cell 225-a and the second cell 225-b.

Figure 3:
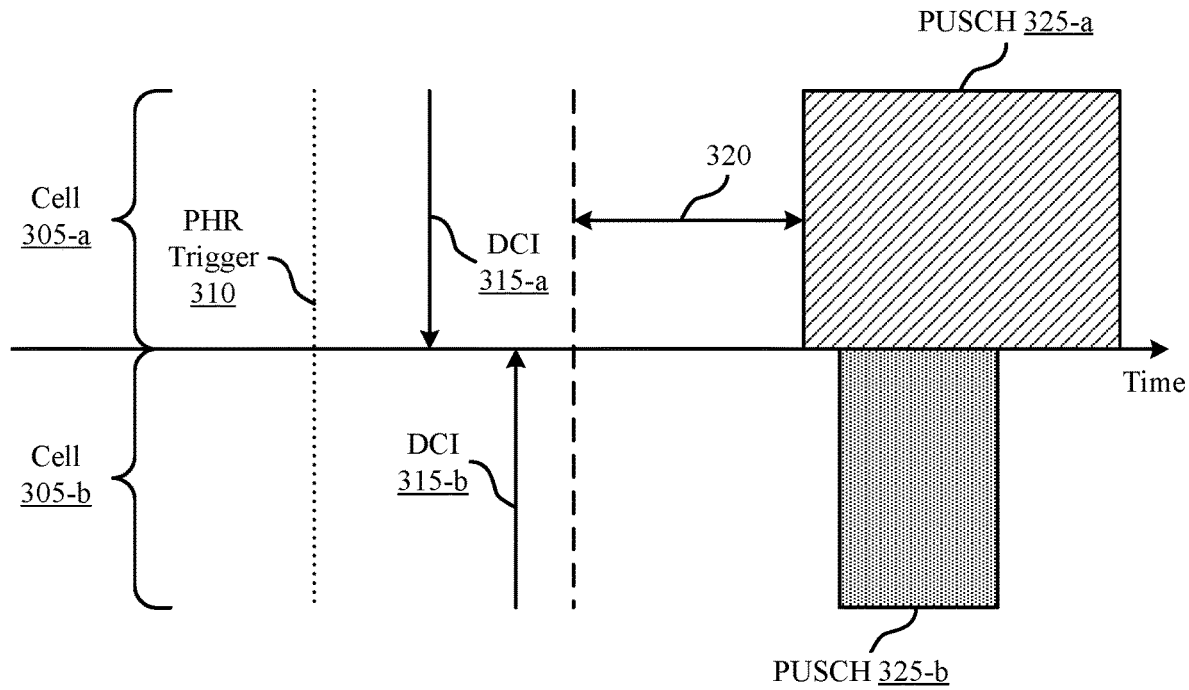
FIGS. 3 through 5 illustrate examples of power headroom reporting timelines that support a power headroom reporting procedure for multiple cells in accordance with aspects of the present disclosure.

FIG. 3 illustrates an example of a power headroom reporting timeline 300 that supports a power headroom reporting procedure for multiple cells in accordance with aspects of the present disclosure. The power headroom reporting timeline 300 illustrates UE 115 operation for reporting power headroom measurements for multiple cells 305 (e.g., a first cell 305-a and a second cell 305-b). The UE 115 may be an example of a UE 115 as described with reference to FIGS. 1 and 2. According to the power headroom reporting timeline 300, the UE 115 may perform multiple calculations (e.g., "actual" power headroom calculations) for improved power headroom reporting accuracy.

A UE 115 may identify a PHR trigger 310. In some cases, this PHR trigger 310 may be associated with a specific cell 305. In other cases, the PHR trigger 310 may correspond to multiple (e.g., all) cells 305 serving the UE 115 (e.g., for a specific MAC entity). Based on this identified PHR trigger 310, the UE 115 may schedule a PHR transmission in uplink resources (e.g., PUSCH resources 325). In one example, the UE 115 may receive DCI 315-a in a first monitoring occasion for a first cell 305-a. DCI 315-a may indicate a schedule for the UE 115 for uplink transmission in PUSCH resources 325-a. The UE 115 may determine to transmit the PHR in these scheduled PUSCH resources 325-a based on the PHR trigger 310 and the received DCI 315-a.

In some cases, rather than use the first DCI 315-a reception point as a reference point for power headroom calculation, the UE 115 may identify a PHR timing capability (e.g., a UE-specific PHR timing capability, a cell-specific PHR timing capability, a subcarrier spacing (SCS) dependent PHR timing capability, etc.) for power headroom calculation. In some cases, the PHR timing capability may be equal to or a function of a PUSCH preparation timeline, $N_2$, which may refer to the time the UE 115 uses between the last symbol of DCI 315 and the first symbol of the corresponding PUSCH resources 325 to process the DCI 315 and prepare an uplink transmission. In some examples, the value of $N_2$ may be specific to the cell 305 in which the UE 115 reports the PHR.

Additionally or alternatively, the PHR timing capability may depend on other internal processing capabilities of the UE 115. This PHR timing capability may correspond to an amount of time 320 used by the UE 115 to calculate a power headroom measurement for a cell 305 based on a transmit power allocated for PUSCH resources 325. Using this PHR timing capability and the initial symbol of the scheduled PUSCH resources 325-a, the UE 115 may determine a reference point in time marking a deadline for the UE 115 to receive DCI 315 and still support calculating a power headroom based on this received DCI 315. This reference point based on the PHR timing capability may be after the first DCI 315-a reception time. As such, the first DCI 315-a may trigger the UE 115 to begin preparing a PHR, but the UE 115 may take into account transmit powers indicated in DCIs 315 received after this first DCI 315-a (but before the identified PHR timing reference point) when calculating power headroom measurements of other cells for the PHR. Such an approach to power headroom calculation allows for a gap between the two DCIs 315, supporting PHR reporting of a more accurate power headroom measurement for the second cell 305-b (e.g., as the power headroom for the second cell 305-b may be determined using an "actual" power headroom calculation, as opposed to a "virtual" power headroom calculation).

For example, a first DCI 315-a and a second DCI 315-b may be received by a UE 115, where the second DCI 315-b is received after the first DCI 315-a. The first DCI 315-a may assign first PUSCH resources 325-a to the UE 115 for uplink transmissions for a first cell 305-a, and the second DCI 315-b may assign second PUSCH resources 325-b to the UE 115 for uplink transmissions for a second cell 305-b.

Once the UE 115 receives the first DCI 315-a, the UE 115 may calculate a power headroom measurement for the first cell 305-a using information in the first DCI 315-a (e.g., transmit parameters for the PUSCH resources 325-a). Additionally, the UE 115 may begin a virtual power headroom calculation for a second cell 305-b. The UE 115 may schedule the transmission of the PHR for these first PUSCH resources 325-a.

While calculating the power headroom for the first cell 305-a, the UE 115 may receive the second DCI 315-b indicating the second PUSCH resources 325-b. The UE 115 may determine whether the second DCI 315-b is received before the PHR timing reference point (e.g., whether the second DCI 315-b is received at least an amount of time 320 in advance of the first symbol of the scheduled PUSCH resources 325-a). If so, the UE 115 may calculate the power headroom for the second cell 305-b using transmit parameters—that may be indicated by this second DCI 315-b in some examples—for the second PUSCH resources 325-b. This calculation based on the actual grant may result in a more accurate power headroom measurement for the second cell 305-b than a virtual calculation, as the actual assigned transmit power may be used for the calculation.

In some cases, the operation described with reference to FIG. 3 may be used for scenarios where both sets of PUSCH resources 325 are used by the UE 115. For example, the UE 115 may transmit on the uplink simultaneously in the first PUSCH resources 325-a and the second PUSCH resources 325-b (e.g., if the component carriers for the cells 305 are inter-band or intra-band contiguous). Alternatively, the operation described may be used if resources are dropped from either of the sets of PUSCH resources 325 (e.g., due to the UE 115 not supporting concurrent transmissions in the two cells 305).

Figure 4:
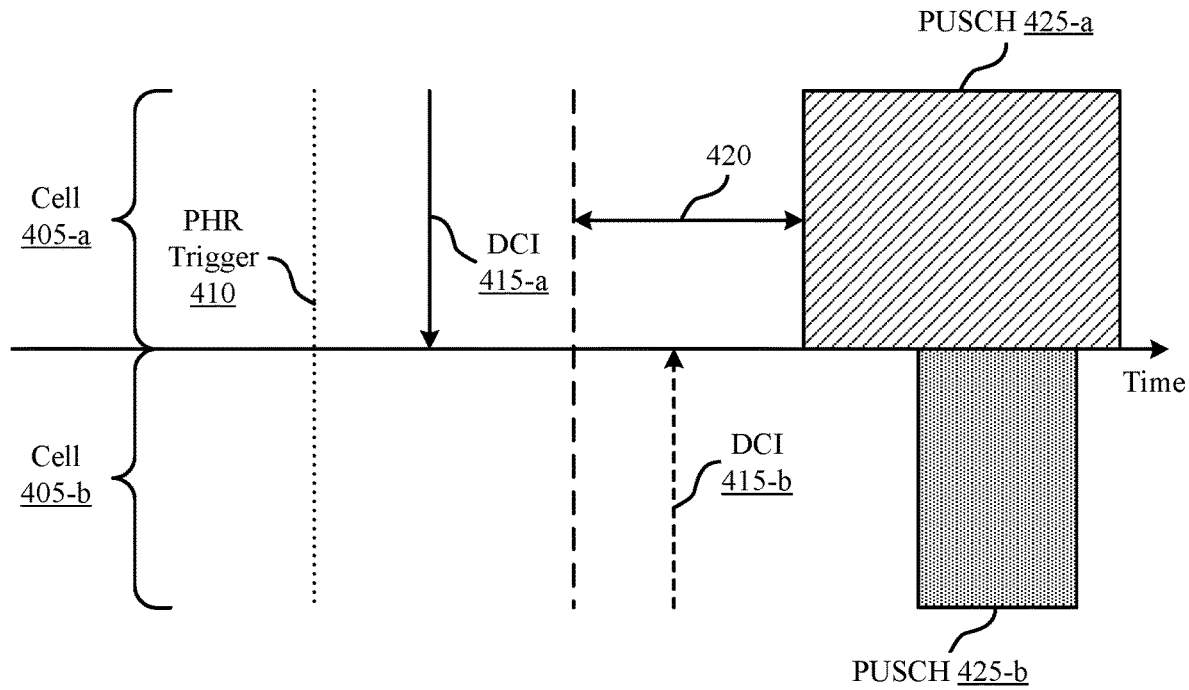

FIG. 4 illustrates an example of a power headroom reporting timeline 400 that supports a power headroom reporting procedure for multiple cells in accordance with aspects of the present disclosure. The power headroom reporting timeline 400 illustrates UE 115 operation(s) for reporting power headroom measurements for multiple cells 405 (e.g., a first cell 405-a and a second cell 405-b). The UE 115 may be an example of a UE 115 as described with reference to FIGS. 1 through 3. According to the power headroom reporting timeline 400, the UE 115 may handle a power headroom calculation for a cell 405 if a DCI 415 is not received for that cell 405 before a PHR timing capability reference point.

A UE 115 may identify a PHR trigger 410. Based on this identified PHR trigger 410, the UE 115 may schedule a PHR transmission in uplink resources (e.g., PUSCH resources 425). In one example, the UE 115 may receive DCI 415-a in a first monitoring occasion for a first cell 405-a (e.g., over a first carrier). DCI 415-a may indicate a schedule for the UE 115 for uplink transmission in PUSCH resources 425-a. The UE 115 may determine to transmit the PHR in these scheduled PUSCH resources 425-a based on the PHR trigger 410 and the received DCI 415-a.

The UE 115 may determine whether a DCI 415 is received for the second cell 405-b after the first DCI 415-a and before the PHR timing reference point. This PHR timing reference point may be determined by the UE 115 as described above with reference to FIG. 3. In some cases, no DCI 415 is received by the UE 115 for the second cell 405-b while there is an amount of time 420 remaining before the PHR transmission in the PUSCH resources 425-a. In one example, the UE 115 may not receive any DCI 415 for the second cell 405-b before transmission of the PHR. In another example, the UE 115 may receive a second DCI 415-*b* for the second cell 405-*b* when there is not enough time for the UE 115 to process the DCI 415 and calculate a power headroom measurement based on information in the DCI 415 (e.g., the second DCI 415-*b* is received after the PHR timing reference point).

The amount of time 420 needed to process a second DCI 415 for the second cell 405-*b* may be a pre-defined value, $T_{proc,2}$. In such cases, the UE 115 calculation of the power headroom for the second cell 405-*b* may not be based on a scheduled PUSCH 425-*b* for the second cell 405-*b* (e.g., according to a transmit power indicated in DCI 415-*b*). Instead, the UE 115 may use other values or parameters to determine the power headroom for the second cell 405-*b* such that the UE 115 may include a power headroom measurement for the second cell 405-*b* in the PHR transmitted in the first PUSCH resources 425-*a*.

In a first example, the UE 115 may calculate a virtual power headroom for the second cell 405-*b* and may include the virtual power headroom calculation result in the PHR transmitted in the first PUSCH resources 425-*a* (e.g., along with a power headroom measurement for the first cell 405-*a* based on the first DCI 415-*a* and the indicated transmit power for the first PUSCH).

In a second example, the UE 115 may calculate the power headroom based on a previous PUSCH. The UE 115 may be assigned PUSCH resources 425 for the second cell 405-*b* before receiving the first DCI 415-*a*, before the PHR trigger 410, or both. The UE 115 may use the transmit power for these previously assigned PUSCH resources 425 (e.g., the most recent PUSCH transmitted on cell 405-*b* before the first DCI 415-*a* scheduling the PUSCH resources 425-*a* on cell 405-*a* is received) to calculate the power headroom for the second cell 405-*b*.

In a third example, the UE 115 may calculate the power headroom based on grant-free PUSCH resources 425. The UE 115 may be configured with grant-free PUSCH resources 425 for cell 405-*b*, where the UE 115 is configured with a transmit power for each of these grant-free resource sets. The UE 115 may calculate the power headroom for the second cell 405-*b* using a transmit power for grant-free resources scheduled for before the first DCI 415-*a* is received (e.g., a most recent grant-free PUSCH opportunity) or scheduled for after the first PUSCH resources 425-*a*, the PUSCH resources 425-*b*, or both (e.g., a next grant-free PUSCH opportunity). In some cases, the UE 115 may be configured to operate according to one of the examples above if no DCI 415 is received for the second cell 405-*b* between the first DCI 415-*a* reception and the PHR timing reference point. In other cases, the UE 115 may semi-statically or dynamically select which example to operate according to based on one or more parameters (e.g., temporal proximity of previous or subsequent PUSCH resources, information in the first DCI 415-*a*, etc.).

These examples may support power headroom calculation for the second cell 405-*b* (and the second carrier) with or without granted PUSCH as a reference for the calculation. In some cases, the second and third examples may be implemented as alternatives to the PHR timing reference point, where the UE 115 may use one or both of these operations to determine a power headroom calculation regardless of the timing of the second DCI 415-*b*. In other cases, the PHR timing may be further relaxed (e.g., the amount of time 420 may be extended) based on one or both of these operations.

Figure 5:
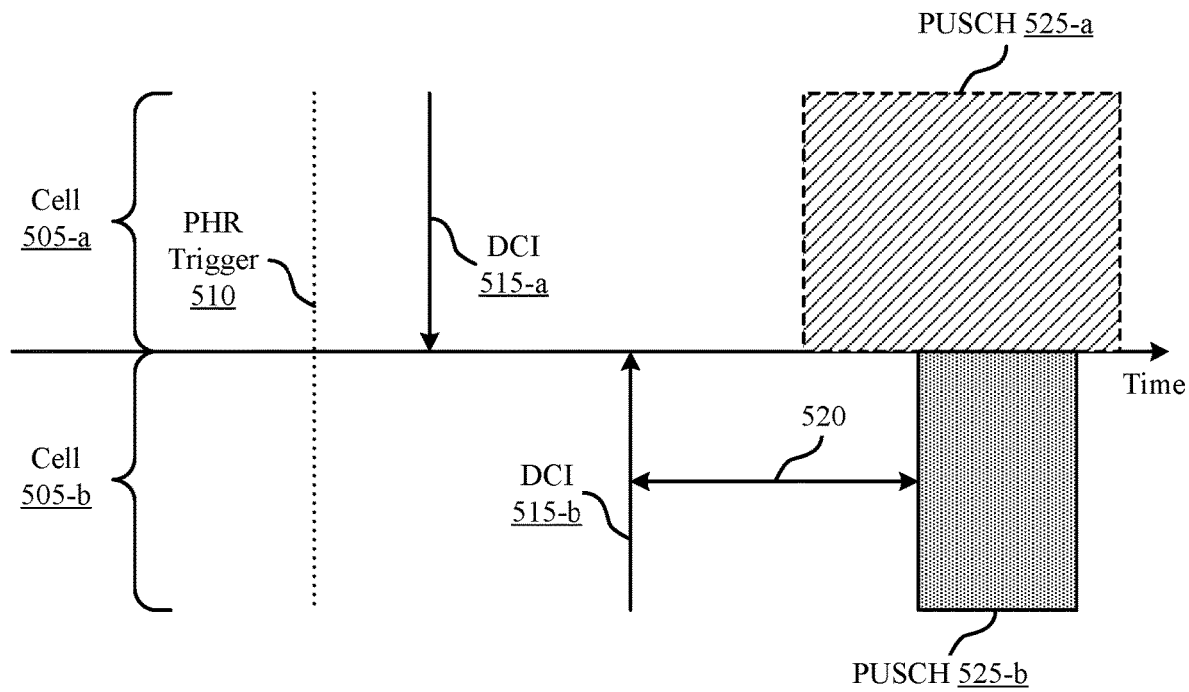

FIG. 5 illustrates an example of a power headroom reporting timeline 500 that supports a power headroom reporting procedure for multiple cells in accordance with aspects of the present disclosure. The power headroom reporting timeline 500 illustrates UE 115 operation for reporting power headroom measurements for multiple cells 505 (e.g., a first cell 505-*a* and a second cell 505-*b*). The UE 115 may be an example of a UE 115 as described with reference to FIGS. 1 through 4. According to the power headroom reporting timeline 500, the UE 115 may drop resources from one or more sets of PUSCH resources 525 to avoid overlapping uplink transmissions. In such cases, the UE 115 may manage power headroom reporting so that a PHR is transmitted to a base station 105 despite the resource dropping.

In the power headroom reporting timeline 500, a UE 115 may identify a PHR trigger 510, which may prompt the UE 115 to report power headroom measurements for one or more serving cells 505. Based on this identified PHR trigger 510, the UE 115 may schedule a PHR transmission in uplink resources (e.g., PUSCH resources 525). In one example, the UE 115 may receive DCI 515-*a* for a first cell 505-*a*. DCI 515-*a* may indicate a schedule for the UE 115 for uplink transmissions in first PUSCH resources 525-*a*. The UE 115 may determine to transmit the PHR in these scheduled first PUSCH resources 525-*a* based on the PHR trigger 510 and the received first DCI 515-*a*. In some cases, however, the UE 115 may receive second DCI 515-*b* for a second cell 505-*b*. DCI 515-*b* may schedule the UE 115 for uplink transmissions in second PUSCH resources 525-*b* that overlap in time, frequency, or both with the first PUSCH resources 525-*a*. The UE 115 may not support simultaneous or concurrent transmissions to different cells 505 in these two sets of overlapping PUSCH resources 525.

In some cases, the UE 115 may drop (e.g., intentionally drop) resources from one of these sets of PUSCH resources 525 to avoid transmitting partially or fully overlapping signals on the uplink (e.g., if the UE 115 does not support transmitting at least partially overlapping PUSCH transmissions concurrently when these PUSCH transmissions are scheduled on intra-band component carriers). For example, the UE 115 may drop the first PUSCH resources 525-*a* corresponding to the first DCI 515-*a* due to the presence of the second PUSCH resources 525-*b*. In some examples, the second PUSCH resources 525-*b* may correspond to eURLLC PUSCH resources, which may have a relatively higher transmission priority than the first PUSCH resources 525-*a* (e.g., eMBB PUSCH resources). If the first PUSCH is dropped, the UE 115 may adaptively switch the PHR transmission to the second PUSCH. This PHR may contain calculated power headroom measurements for both the first cell 505-*a* and the second cell 505-*b*. The UE 115 may determine the power headroom for the second cell 505-*b* using an actual power headroom calculation (e.g., based on the actual transmit power for the second PUSCH resources 525-*b* indicated in the second DCI 515-*b*). The UE 115 may calculate the power headroom for the first cell 505-*a* using an actual or virtual computation.

In a first example, the UE 115 may determine whether to calculate the actual power headroom (e.g., based on the transmit power indicated in the first DCI 515-*a* for the first PUSCH resources 525-*a*) or the virtual power headroom (e.g., based on pre-configured values or parameters in the second DCI 515-*b* for the second PUSCH resources 525-*b*) for the first cell 505-*a*. The UE 115 may make this determination based on the timing or contents of the received DCIs 515, the scheduled PUSCH resources 525, or both. In some cases, the UE 115 may calculate the power headroom for the first cell 505-*a* based on a virtual computation if there is a sufficient time gap 520 between the end of the second PDCCH (e.g., the second DCI 515-*b*) and the beginning of the second PUSCH 525-*b*.

If this time gap 520 is at least as long as the timing used to conduct a virtual power headroom computation for the first cell 505-*a*, the UE 115 may re-calculate the power headroom for the first cell 505-*a* using this virtual computation. In other cases, if the time gap 520 is not sufficient for re-calculation, the UE 115 may include the power headroom calculated for the first cell 505-*a* based on the actual grant (e.g., the transmit power in the first DCI 515-*a* granting the first PUSCH resources 525-*a*).

In yet other cases (e.g., if the first symbol of the second PUSCH resources 525-*b* precedes the first symbol of the first PUSCH resources 525-*a* such that the PHR is sent in the second PUSCH resources 525-*b* before completion of an actual calculation for the first cell 505-*a*), the UE 115 may calculate the power headroom for the first cell 505-*a* using some other type of computation (e.g., a low latency virtual calculation based on the processing times of the second cell 505-*b*). For example, the processing time used by the UE 115 to calculate power headroom values on different cells 505 may be SCS dependent or may be dependent on different timing capabilities for the cells 505.

In one case, the processing time for eMBB power headroom calculation may be longer than the processing time for URLLC power headroom calculation. Thus, the power headroom timing for the first cell 505-*a* may be different than the power headroom timing for the second cell 505-*b*. In some cases, the UE 115 may report timing capabilities for one or more cells 505 to a base station 105.

In a second example, the UE 115 may calculate the actual power headroom for the first cell 505-*a* (e.g., regardless or independent of the timing). When the second PUSCH resources 525-*b* are scheduled, the UE 115 may drop the first PUSCH resources 525-*a* carrying the first PHR (e.g., based on a priority metric of the second PUSCH resources 525-*b* being greater than a priority metric for the first PUSCH resources 525-*a*). The UE 115 may instead include the power headroom measurements for both the first cell 505-*a* and the second cell 505-*b* in a PHR transmitted in the second PUSCH resources 525-*b*. These power headroom measurements may include both actual power headroom measurements based on the respective transmit powers indicated in the respective DCI 515 transmissions. For example, when the first DCI 515-*a* is received, the UE 115 may begin calculating the actual power headroom of the first cell 505-*a* based on the PUSCH transmit power information included in this first DCI 515-*a*. Rather than perform any re-calculation, the UE 115 may use this value in a PHR transmitted in the second PUSCH resources 525-*b*.

The UE 115 may maintain a PHR trigger 510 to support PUSCH resource dropping without dropping PHR transmission. For example, rather than canceling one or more PHR triggers 510 when the first DCI 515-*a* is received and the power headroom calculations are initiated, the UE 115 may maintain the PHR trigger(s) 510. The UE 115 may cancel the PHR trigger(s) 510 if the PUSCH carrying the PHR is not cancelled or partially dropped (e.g., based on another PUSCH). For example, the UE 115 may maintain the PHR trigger(s) 510 until the PHR is actually transmitted in the PUSCH resources 525. Based on this condition being met (e.g., based on the PHR transmission), the UE 115 may cancel the PHR trigger(s) 510 (e.g., all of the PHR triggers). Additionally or alternatively, the UE 115 may restart a PHR prohibit timer upon transmitting the PHR, as opposed to when the DCI 515 is received.

In some cases, a UE 115 may be configured to operate according to the processes described with respect to FIGS. 3 and 4. In other cases, the UE 115 may be configured to operate according to the processes described with respect to FIG. 5. In yet other cases, the UE 115 may operate according to some combination of these processes. For example, the UE 115 may perform some combination of these operations or may select between these operations based on one or more parameters.

For example, in some systems, a PHR may be sent on a PUSCH if the PUSCH corresponds to an initial transmission of a TB. This may be based on the bit buffering procedure at a UE 115. For example, for an initial transmission of a TB, a UE 115 may encode a set of payload bits and may load the encoded bits into a buffer (e.g., a HARQ buffer, a circular buffer, etc.). The UE 115 may transmit a selection of bits from the buffer in a codeword as the initial TB transmission. For each re-transmission of the TB, the UE 115 may select different sets of bits from the pre-loaded buffer for transmission. Accordingly, the UE may not be able to introduce new information (e.g., a PHR) into a TB re-transmission without re-encoding the TB with additional bits representing the new information. Therefore, if the initial transmission of a TB does not contain a PHR, the UE 115 may not be able to include the PHR in a TB re-transmission.

As such, a UE 115 may implement the first operation described with respect to FIGS. 3 and 4 if the first PUSCH corresponds to the first transmission of a TB and is not a re-transmission. In this case, the second PUSCH may or may not correspond to a re-transmission of a TB. Alternatively, the UE 115 may implement the second operation described with respect to FIG. 5 if the second PUSCH corresponds to the initial transmission of a TB. In this case, the first PUSCH may or may not correspond to a re-transmission of a TB. In some cases, neither of the sets of PUSCH resources correspond to initial TB transmissions, or the resources (e.g., the first PUSCH resources) corresponding to an initial TB transmission may be dropped. In these cases, the UE 115 may be able to send the PHR in later PUSCH resources (e.g., corresponding to a new TB or corresponding to a re-transmission of a TB if the initial TB was dropped but included the PHR). For example, if the UE 115 drops first PUSCH resources 525-*a*, and if second PUSCH resources 525-*b* correspond to a re-transmission of a TB, the UE 115 may transmit the PHR in next available PUSCH resources 525 that are not dropped and that are associated with an initial transmission of a HARQ process. The type of TB is one way that the UE 115 may determine which power headroom reporting operation to implement based on adaptive reporting scenarios, although other ways of selecting a power headroom reporting operation may be supported.

Figure 6:
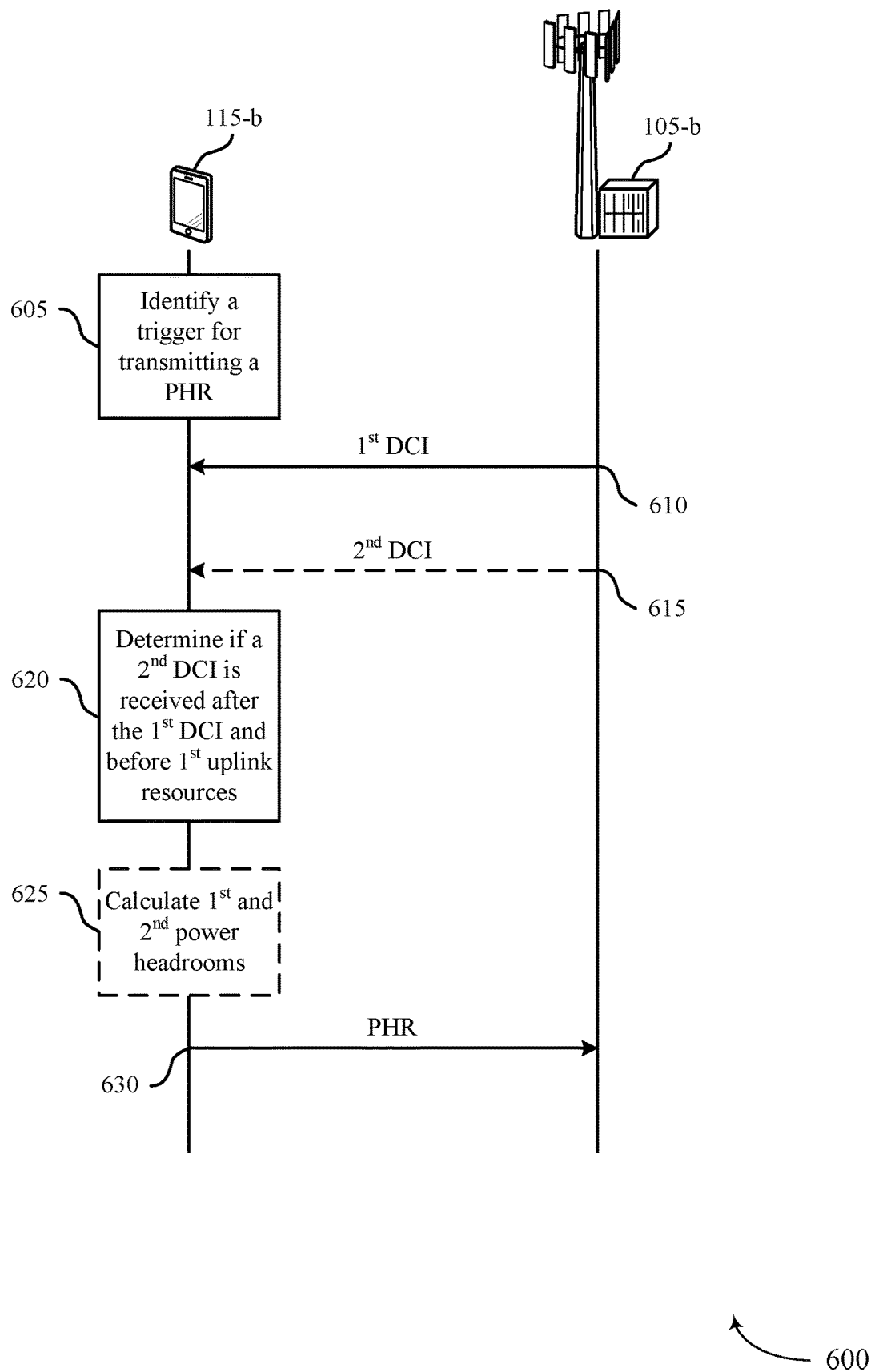
FIG. 6 illustrates an example of a process flow that supports a power headroom reporting procedure for multiple cells in accordance with aspects of the present disclosure.

FIG. 6 illustrates an example of a process flow 600 that supports a power headroom reporting procedure for multiple cells in accordance with aspects of the present disclosure. The process flow 600 may include a base station 105-*b* and a UE 115-*b*, which may be examples of the corresponding devices described with reference to FIGS. 1 through 5. UE 115-*b* may transmit a multiple PHR to base station 105-*b* using one or more operations for improved accuracy, improved reliability, or both. Alternative examples of the following may be implemented, where steps may be performed in a different order than described or are not performed at all. In some cases, steps may include additional features not mentioned below, or further steps may be added.

At 605, UE 115-*b* may identify a trigger for transmitting a PHR. The PHR may be triggered if UE 115-*b* identifies that a timer, such as a periodic timer (e.g., phr-PeriodicTimer), has expired. The PHR may also be triggered if UE 115-*b* identifies that a second time, such as a prohibit timer (e.g., phr-ProhibitTimer), has expired and if UE 115-*b* determines that a current path loss for at least one cell differs from a reference path loss for the same cell or cells by more than a path loss change threshold (e.g., phr-Tx-PowerFactor-Change). The first and second reference cells for determining the path loss may be the same cells or may be different cells. Once UE 115-*b* identifies a trigger for transmitting a PHR, UE 115-*b* may maintain the trigger after it has received a first DCI. Once UE 115-*b* has transmitted the PHR, UE 115-*b* may cancel or discard the identified trigger. Additionally or alternatively, UE 115-*b* may reset a PHR prohibit timer upon transmitting the PHR.

At 610, UE 115-*b* may receive a first DCI from base station 105-*b*. The first DCI may indicate first uplink resources for a first cell and may be received on a first carrier. The first uplink resources may be a PUSCH or other examples of uplink resources. The first DCI may be transmitted by base station 105-*b* on a first PDCCH or other examples of downlink resources. The first DCI may also indicate a first transmit power for UE 115-*b* to use for transmissions in the first uplink resources.

At 615, UE 115-*b* may in some cases receive a second DCI from base station 105-*b* (or a different base station 105). The second DCI may indicate second uplink resources for a second cell and may be received on a second carrier. The second uplink resources may be a PUSCH or other examples of uplink resources. The second DCI may be transmitted by base station 105-*b* on a second PDCCH or other examples of downlink resources. In some cases, the second uplink resources may be scheduled such that they overlap in time with the first uplink resources. The second DCI may also indicate a transmit power for UE 115-*b* to use for transmissions in the second uplink resources.

At 620, UE 115-*b* may determine if it received a second DCI and may determine timing of any received second DCI. For example, UE 115-*b* may determine if a second DCI was received after the first DCI and before the first set of uplink resources scheduled by the first DCI. In some cases, UE 115-*b* may additionally determine whether the second DCI is received before a PHR reference time. The PHR reference time may be based on a power headroom processing timeline for the first cell, which in turn may be based on processing capabilities of the UE 115-*b*, an SCS for the first cell, other information, or any combination thereof. In some examples, UE 115-*b* may transmit a report to base station 105-*b* indicating a processing capability of the UE 115-*b*, an SCS for the first cell, other information, or any combination thereof.

In one case, UE 115-*b* may receive the second DCI after receiving the first DCI and before the PHR reference time. The PHR reference time may be based on a power headroom processing timeline for the first cell and the initial symbol of the first uplink resources. In this case, the calculation of the second power headroom may be based on the second transmit power indicated by the second DCI. The PHR may include the second power headroom calculated based on the second transmit power and a first power headroom calculated based on the first transmit power.

In another case, UE 115-*b* may determine that the second DCI was not received after the first DCI and before the power headroom reference time. For example, UE 115-*b* may receive the second DCI after the PHR reference time. In this case, UE 115-*b* may calculate the second power headroom for the PHR based on the determination that the second DCI was not received after the first DCI and before the power headroom reference time. For example, the calculation of the second power headroom may be based on a virtual calculation, which may be based on one or more pre-configured parameters, one or more parameters indicated by the first DCI, other information, or any combination thereof. The calculation of the second power headroom may additionally or alternatively be based on a transmit power for previous uplink resources for the second cell. The previous uplink resources may have been scheduled before receiving the first DCI. Furthermore, calculating the second power headroom may additionally or alternatively be based on a transmit power for a previous grant-free uplink opportunity or a next grant-free uplink opportunity. The previous grant-free uplink opportunity may have been scheduled before receiving the first DCI.

In another case, UE 115-*b* may receive the second DCI after receiving the first DCI and before the first uplink resources scheduled by the first DCI. The second DCI may indicate second uplink resources that at least partially overlap in time with the first uplink resources. The UE 115-*b* may drop at least a portion of resources from either the first uplink resources or the second uplink resources based on the overlapping resources. The PHR may be transmitted in either the first uplink resources or the second uplink resources based on which resources are dropped (e.g., if first resources are dropped, the PHR may be sent in the second resources, and vice versa).

In a first example, the first uplink resources may have a first priority value and the second uplink resources may have a second priority value that is different from the first priority value. UE 115-*b* may determine whether to drop a portion of resources of the first uplink resources or the second uplink resources depending on the priority values. In one case, UE 115-*b* may drop a portion of resources from the first uplink resources if the first uplink resources have a lower priority value than the second uplink resources. In another case, UE 115-*b* may drop a portion of resources from the second uplink resources if the second uplink resources have a lower priority value than the first uplink resources.

In a second example, the first uplink resources and the second uplink resources may have the same priority value. In this example, UE 115-*b* may determine whether to drop resources from the first uplink resources or the second uplink resources based on a pre-configuration.

At 625, UE 115-*b* may calculate a first power headroom for a first cell and a second power headroom for a second cell. The PHR may be based on (e.g., include) a power headroom for the first cell and a power headroom for the second cell. In some cases, UE 115-*b* may calculate the first power headroom based on the first transmit power as indicated by the first DCI and may calculate the second power headroom based on a virtual calculation. In other cases, UE 115-*b* may calculate the first power headroom based on a virtual calculation and the second power headroom based on the second transmit power as indicated by the second DCI. In yet other cases, UE 115-*b* may calculate both power headrooms using DCI-indicated transmit powers. A virtual calculation may be based on pre-configured parameters, parameters indicated by a DCI for a different cell, or a combination thereof. In some cases, UE 115-*b* may calculate the second power headroom based on determining whether the second DCI is received before the PHR reference time.

At 630, UE 115-*b* may transmit the PHR to base station 105-*b*. The transmitted PHR may include a first power headroom for a first cell and a second power headroom for a second cell. In some cases, the first power headroom may correspond to a first processing timeline (e.g., an eMBB timeline) and the second cell may correspond to a second processing timeline (e.g., a URLLC timeline) that is different than (e.g., shorter than) the first processing timeline. The PHR may be transmitted in an initial transmission of a TB. In some cases, the PHR may be transmitted by UE 115-*b* in the first uplink resources (e.g., based on receiving the DCI indicating these first uplink resources in a first monitoring occasion). In other cases, UE 115-*b* may transmit the PHR to base station 105-*b* in the second uplink resources based on dropping a portion of the resources (e.g., the first uplink resources). In yet other cases, the first uplink resources and the second uplink resources both correspond to re-transmissions of TBs. In some such cases, UE 115-*b* may transmit the PHR in third uplink resources corresponding to the initial transmission of a TB.

Figure 7:
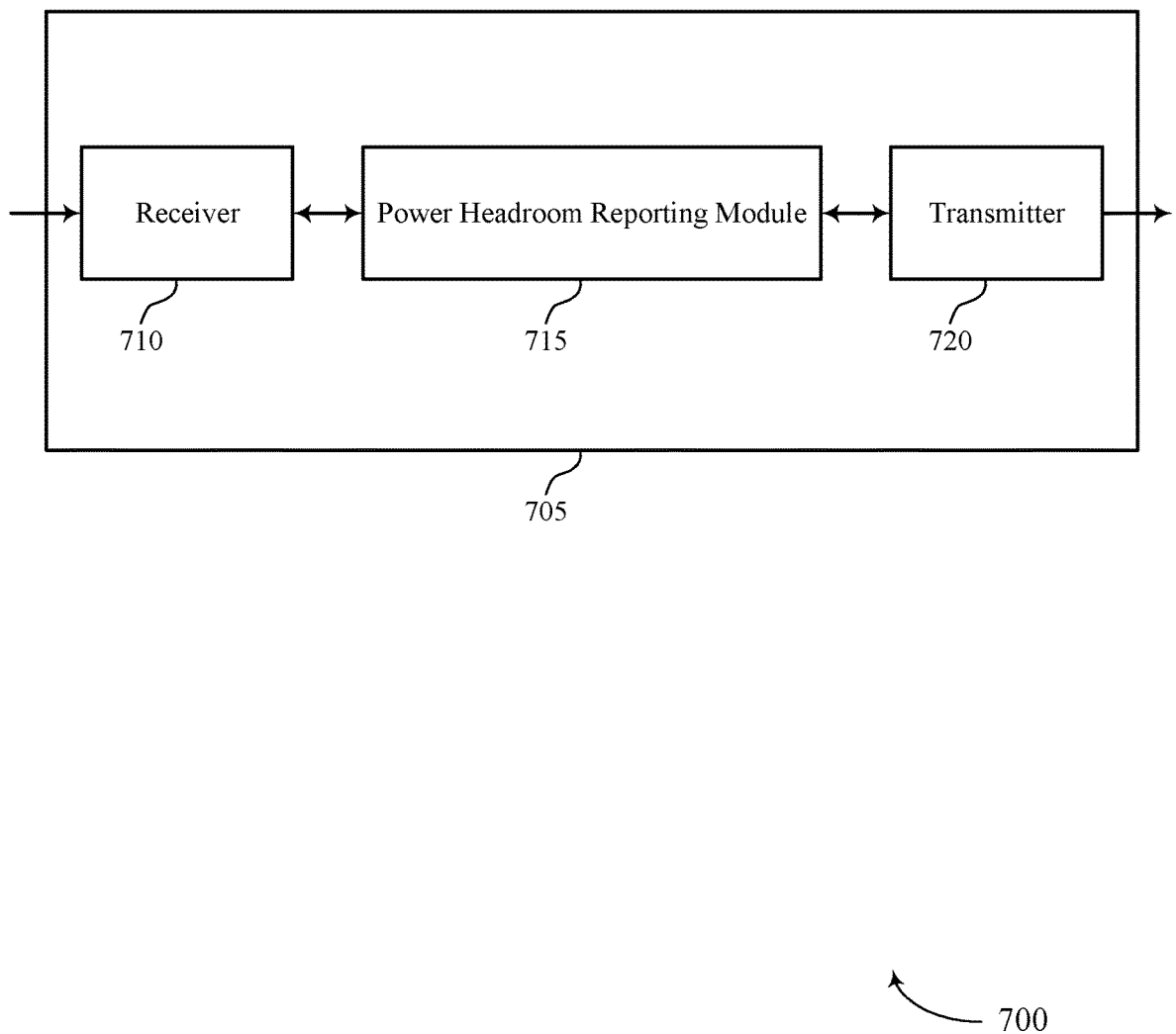
FIGS. 7 and 8 show block diagrams of devices that support a power headroom reporting procedure for multiple cells in accordance with aspects of the present disclosure.

FIG. 7 shows a block diagram 700 of a device 705 that supports a power headroom reporting procedure for multiple cells in accordance with aspects of the present disclosure. The device 705 may be an example of aspects of a UE 115 as described herein. The device 705 may include a receiver 710, a power headroom reporting module 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to a power headroom reporting procedure for multiple cells, etc.). Information may be passed on to other components of the device 705. The receiver 710 may be an example of aspects of the transceiver 1020 described with reference to FIG. 10. The receiver 710 may utilize a single antenna or a set of antennas.

The power headroom reporting module 715 may identify a trigger for transmitting a PHR and may receive first DCI indicating first uplink resources for a first cell. The power headroom reporting module 715 may further determine whether second DCI indicating second uplink resources for a second cell is received after receiving the first DCI and before the first uplink resources. The power headroom reporting module 715 may transmit the PHR including a first power headroom for the first cell and a second power headroom for the second cell, where the PHR is based on the determining. The power headroom reporting module 715 may be an example of aspects of the power headroom reporting module 1010 described herein.

The actions performed by the power headroom reporting module 715 as described herein may be implemented to realize one or more potential advantages. For example, transmitting the PHR according to whether—and when— second DCI is received may allow a UE 115 to provide more accurate power headroom measurements for multiple cells. The UE 115 may take into account DCI received for a second cell (e.g., when received after DCI for a first cell but prior to a PHR reference time) in order to perform an actual power headroom calculation, as opposed to a potentially less accurate virtual power headroom calculation. Additionally or alternatively, the UE 115 may reduce the latency involved in power headroom reporting when dropping overlapping PUSCH resources by ensuring that the PHR is transmitted in the remaining PUSCH resources.

Based on transmitting the PHR according to whether— and when—second DCI is received, a processor of the UE 115 (e.g., a processor controlling the receiver 710, the power headroom reporting module 715, the transmitter 720, etc.) may reduce processing resources used for power headroom reporting. For example, by supporting more accurate power headroom measurements, the UE 115 may reduce a number of times that power headroom reporting is triggered at the UE 115. Reducing the number of triggered PHR transmissions may reduce a number of times the processor ramps up processing power and turns on processing units to handle power headroom calculations and PHR transmissions.

The power headroom reporting module 715, or its sub-components, may be implemented in hardware, code (e.g., software or firmware) executed by a processor, or any combination thereof. If implemented in code executed by a processor, the functions of the power headroom reporting module 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The power headroom reporting module 715, or its sub-components, may be physically located at various positions, including being distributed such that portions of functions are implemented at different physical locations by one or more physical components. In some examples, the power headroom reporting module 715, or its sub-components, may be a separate and distinct component in accordance with various aspects of the present disclosure. In some examples, the power headroom reporting module 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
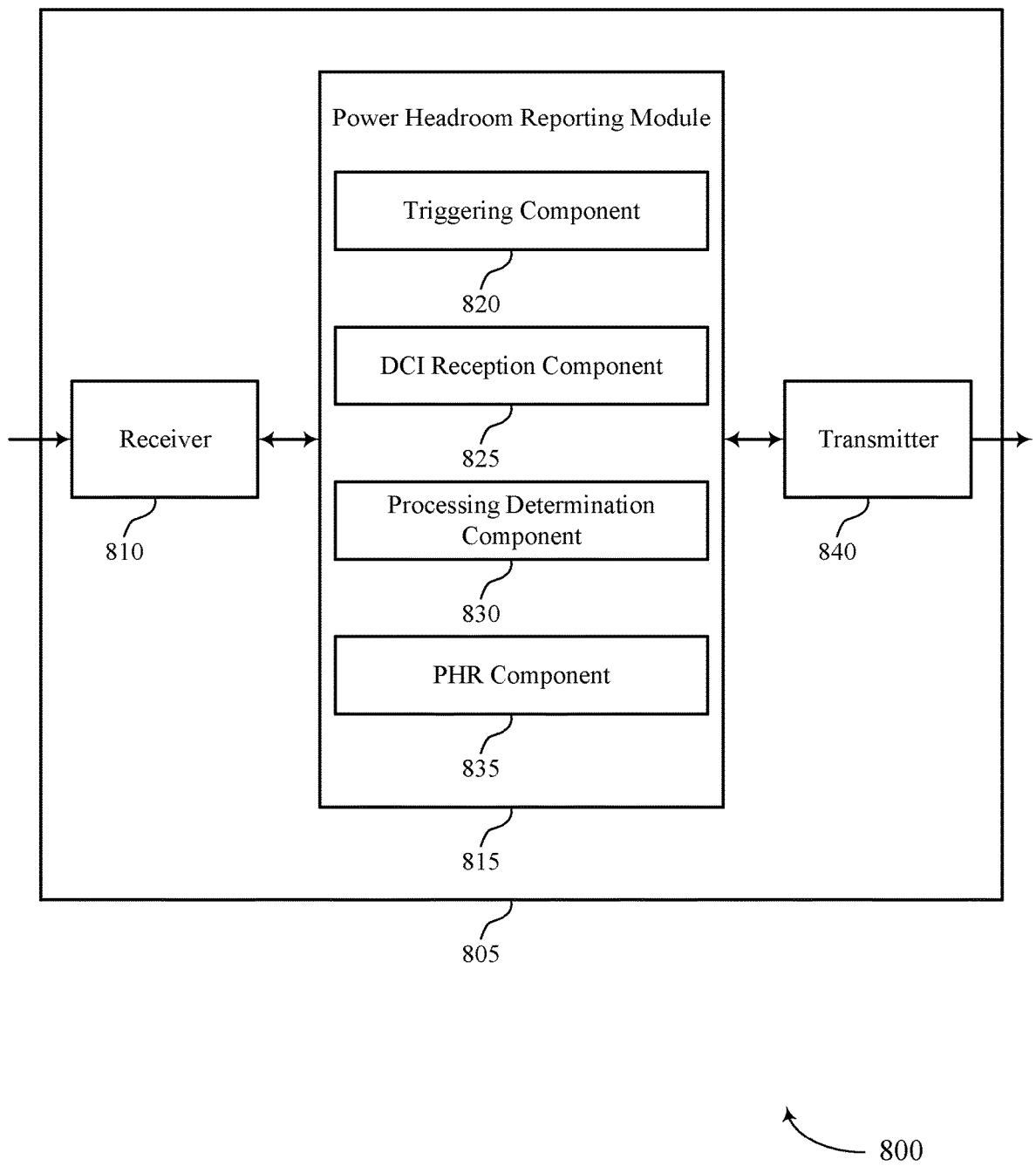

FIG. 8 shows a block diagram 800 of a device 805 that supports a power headroom reporting procedure for multiple cells in accordance with aspects of the present disclosure. The device 805 may be an example of aspects of a device 705, or a UE 115 as described herein. The device 805 may include a receiver 810, a power headroom reporting module 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to a power headroom reporting procedure for multiple cells, etc.). Information may be passed on to other components of the device 805. The receiver 810 may be an example of aspects of the transceiver 1020 described with reference to FIG. 10. The receiver 810 may utilize a single antenna or a set of antennas.

The power headroom reporting module 815 may be an example of aspects of the power headroom reporting module 715 as described herein. The power headroom reporting module 815 may include a triggering component 820, a DCI reception component 825, a processing determination component 830, and a PHR component 835. The power headroom reporting module 815 may be an example of aspects of the power headroom reporting module 1010 described herein.

The triggering component 820 may identify a trigger for transmitting a PHR. The DCI reception component 825 may receive first DCI indicating first uplink resources for a first cell. The processing determination component 830 may determine whether second DCI indicating second uplink resources for a second cell is received after receiving the first DCI and before the first uplink resources. The PHR component 835 may transmit the PHR including a first power headroom for the first cell and a second power headroom for the second cell, where the PHR is based on the determining.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
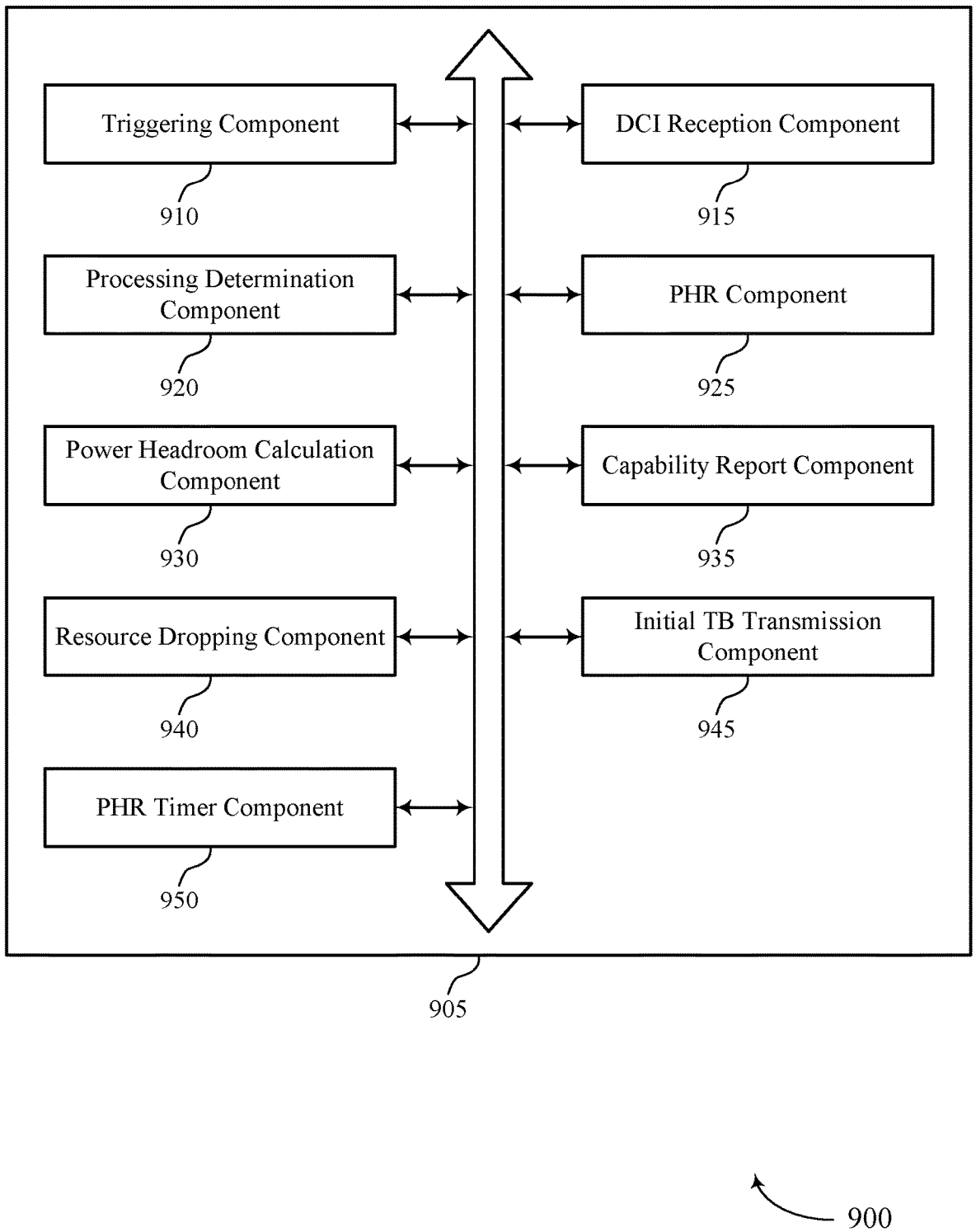
FIG. 9 shows a block diagram of a power headroom reporting module that supports a power headroom reporting procedure for multiple cells in accordance with aspects of the present disclosure.

FIG. 9 shows a block diagram 900 of a power headroom reporting module 905 that supports a power headroom reporting procedure for multiple cells in accordance with aspects of the present disclosure. The power headroom reporting module 905 may be an example of aspects of a power headroom reporting module 715, a power headroom reporting module 815, or a power headroom reporting module 1010 described herein. The power headroom reporting module 905 may include a triggering component 910, a DCI reception component 915, a processing determination component 920, a PHR component 925, a power headroom calculation component 930, a capability report component 935, a resource dropping component 940, an initial TB transmission component 945, and a PHR timer component 950. Each of these modules may communicate, directly or indirectly, with one another (e.g., via one or more buses).

The triggering component 910 may identify a trigger for transmitting a PHR. In some cases, identifying the trigger for transmitting the PHR involves the PHR timer component 950 identifying that a PHR prohibit timer has expired and determining that a current path loss for at least one cell differs from a reference path loss for the at least one cell by more than a path loss change threshold, where the reference path loss corresponds to a most recent PHR transmission for the at least one cell. In other cases, identifying the trigger for transmitting the PHR involves the PHR timer component 950 identifying that a PHR periodic timer has expired.

The DCI reception component 915 may receive first DCI indicating first uplink resources for a first cell. In some cases, the power headroom calculation component 930 may calculate the first power headroom based on a transmit power indicated by the first DCI, where the PHR is based on calculating the first power headroom.

The processing determination component 920 may determine whether second DCI indicating second uplink resources for a second cell is received after receiving the first DCI and before the first uplink resources. In some cases, the processing determination component 920 may determine whether the second DCI is received before a PHR reference time that is based on a power headroom processing timeline for the first cell and an initial symbol of the first uplink resources. In these cases, the power headroom calculation component 930 may calculate the second power headroom based on the determining whether the second DCI is received before the PHR reference time, where the PHR is based on calculating the second power headroom.

In some examples, the DCI reception component 915 may receive the second DCI after receiving the first DCI and before the PHR reference time. In these examples, the power headroom calculation component 930 may calculate the second power headroom based on a transmit power indicated by the second DCI, where the PHR is based on calculating the second power headroom.

In other examples, the processing determination component 920 may determine that the second DCI is not received after the first DCI and before the PHR reference time, where calculating the second power headroom is based on determining that the second DCI is not received.

In a first example, the power headroom calculation component 930 may calculate the second power headroom using a virtual calculation that is based on one or more preconfigured parameters, one or more parameters indicated by the first DCI, or a combination thereof, where the PHR is based on calculating the second power headroom. In a second example, the power headroom calculation component 930 may calculate the second power headroom based on a transmit power for previous uplink resources for the second cell, where the previous uplink resources were scheduled before receiving the first DCI, and where the PHR is based on calculating the second power headroom. In a third example, the power headroom calculation component 930 may calculate the second power headroom based on a transmit power for a previous grant-free uplink opportunity or a next grant-free uplink opportunity for the second cell, where the previous grant-free uplink opportunity was scheduled before receiving the first DCI and the next grant-free uplink opportunity is scheduled after receiving the first DCI, and where the PHR is based on calculating the second power headroom.

In some examples, the DCI reception component 915 may receive the second DCI after the PHR reference time, where determining that the second DCI is not received after the first DCI and before the PHR reference time is based on receiving the second DCI after the PHR reference time.

In some cases, the power headroom processing timeline for the first cell is based on a UE processing capability for the first cell, an SCS for the first cell, or a combination thereof. The capability report component 935 may transmit a report indicating the UE processing capability for the first cell, the SCS for the first cell, or the combination thereof.

In some examples, the DCI reception component 915 may receive the second DCI after receiving the first DCI and before the first uplink resources, where the first uplink resources at least partially overlap with the second uplink resources indicated by the second DCI. In some cases, the resource dropping component 940 may drop at least a portion of resources from either the first uplink resources or the second uplink resources based on the partial overlap, where the PHR is transmitted in either the first uplink resources or the second uplink resources based on the dropping.

In some examples, a first priority value for the first uplink resources is different than a second priority value for the second uplink resources. In these examples, the resource dropping component 940 may determine whether to drop the portion of resources from the first uplink resources or the second uplink resources based on at least one of the first priority value or the second priority value, where the portion of resources is dropped from the first uplink resources if the first priority value is less than the second priority value and the portion of resources is dropped from the second uplink resources if the first priority value is greater than the second priority value. In other examples, the first priority value for the first uplink resources is equal to the second priority value for the second uplink resources. In these examples, the resource dropping component 940 may determine whether to drop the portion of resources from the first uplink resources or the second uplink resources based on a pre-configuration, where dropping at least the portion of resources from either the first uplink resources or the second uplink resources is based on determining whether to drop the portion of resources from the first uplink resources or the second uplink resources.

In some cases, the PHR is transmitted in the second uplink resources based on the dropping. In some of these cases, the power headroom calculation component 930 may calculate the first power headroom based on a transmit power indicated by the first DCI and may calculate the second power headroom based on a transmit power indicated by the second DCI. In others of these cases, the power headroom calculation component 930 may calculate the first power headroom using a virtual calculation, where the virtual calculation is based on one or more pre-configured parameters, one or more parameters indicated by the second DCI, or a combination thereof, and the power headroom calculation component 930 may calculate the second power headroom based on a transmit power indicated by the second DCI. The power headroom calculation component 930 may determine whether to re-calculate the first power headroom based on a power headroom processing timeline for the first cell and an initial symbol of the second uplink resources.

The PHR component 925 may transmit the PHR including a first power headroom for the first cell and a second power headroom for the second cell, where the PHR is based on the determining whether second DCI indicating second uplink resources for a second cell is received after receiving the first DCI and before the first uplink resources. In some cases, the first cell corresponds to a first processing timeline (e.g., an eMBB processing timeline) and the second cell corresponds to a second processing timeline (e.g., a URLLC processing timeline) that is shorter than the first processing timeline.

In some cases, transmitting the PHR may involve the initial TB transmission component 945 transmitting the PHR in an initial transmission of a TB. In some examples, the initial TB transmission component 945 may determine whether to transmit the PHR in the first uplink resources or the second uplink resources based on whether the first uplink resources or the second uplink resources correspond to the initial transmission of the TB. In some examples, if the first uplink resources and the second uplink resources correspond to re-transmissions of TBs, transmitting the PHR may involve the initial TB transmission component 945 transmitting the PHR in third uplink resources corresponding to the initial transmission of the TB.

In some examples, the triggering component 910 may maintain the identified trigger upon receiving the first DCI and may cancel the identified trigger based on transmitting the PHR. In some examples, the PHR timer component 950 may start a PHR prohibit timer upon cancelling the identified trigger.

Figure 10:
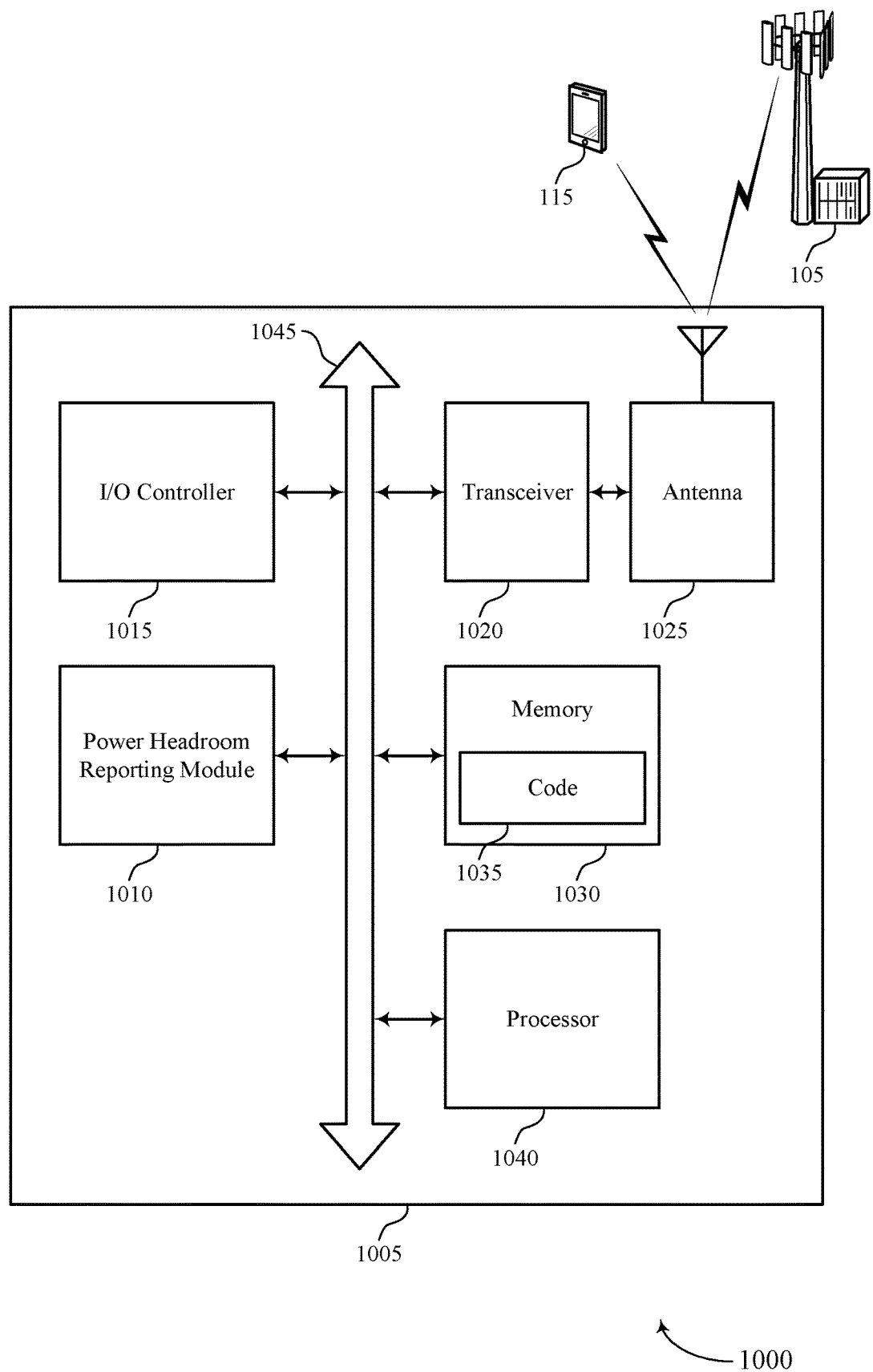
FIG. 10 shows a diagram of a system including a device that supports a power headroom reporting procedure for multiple cells in accordance with aspects of the present disclosure.

FIG. 10 shows a diagram of a system 1000 including a device 1005 that supports a power headroom reporting procedure for multiple cells in accordance with aspects of the present disclosure. The device 1005 may be an example of or include the components of device 705, device 805, or a UE 115 as described herein. The device 1005 may include components for bi-directional voice and data communications including components for transmitting and receiving communications, including a power headroom reporting module 1010, an I/O controller 1015, a transceiver 1020, an antenna 1025, memory 1030, and a processor 1040. These components may be in electronic communication via one or more buses (e.g., bus 1045).

The power headroom reporting module 1010 may identify a trigger for transmitting a PHR, receive first DCI indicating first uplink resources for a first cell, determine whether second DCI indicating second uplink resources for a second cell is received after receiving the first DCI and before the first uplink resources, and transmit the PHR including a first power headroom for the first cell and a second power headroom for the second cell, where the PHR is based on the determining.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting a power headroom reporting procedure for multiple cells).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
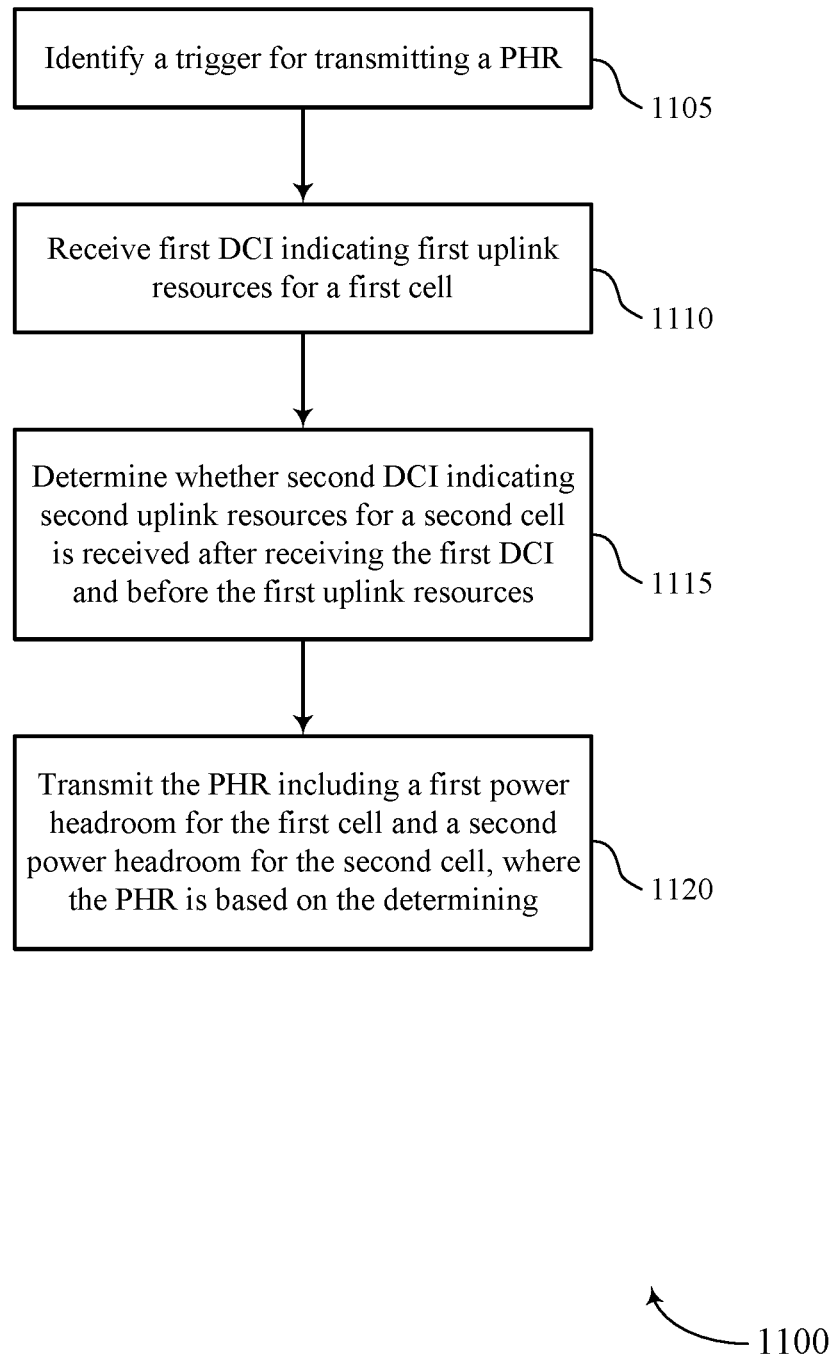
FIGS. 11 through 14 show flowcharts illustrating methods that support a power headroom reporting procedure for multiple cells in accordance with aspects of the present disclosure.

FIG. 11 shows a flowchart illustrating a method 1100 that supports a power headroom reporting procedure for multiple cells in accordance with aspects of the present disclosure. The operations of method 1100 may be implemented by a UE 115 or its components as described herein. For example, the operations of method 1100 may be performed by a power headroom reporting module as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may identify a trigger for transmitting a PHR. The operations of 1105 may be performed according to the methods described herein. In some examples, aspects of the operations of 1105 may be performed by a triggering component as described with reference to FIGS. 7 through 10.

At 1110, the UE may receive first DCI indicating first uplink resources for a first cell. The operations of 1110 may be performed according to the methods described herein. In some examples, aspects of the operations of 1110 may be performed by a DCI reception component as described with reference to FIGS. 7 through 10.

At 1115, the UE may determine whether second DCI indicating second uplink resources for a second cell is received after receiving the first DCI and before the first uplink resources. The operations of 1115 may be performed according to the methods described herein. In some examples, aspects of the operations of 1115 may be performed by a processing determination component as described with reference to FIGS. 7 through 10.

At 1120, the UE may transmit the PHR including a first power headroom for the first cell and a second power headroom for the second cell, where the PHR is based on the determining. The operations of 1120 may be performed according to the methods described herein. In some examples, aspects of the operations of 1120 may be performed by a PHR component as described with reference to FIGS. 7 through 10.

Figure 12:
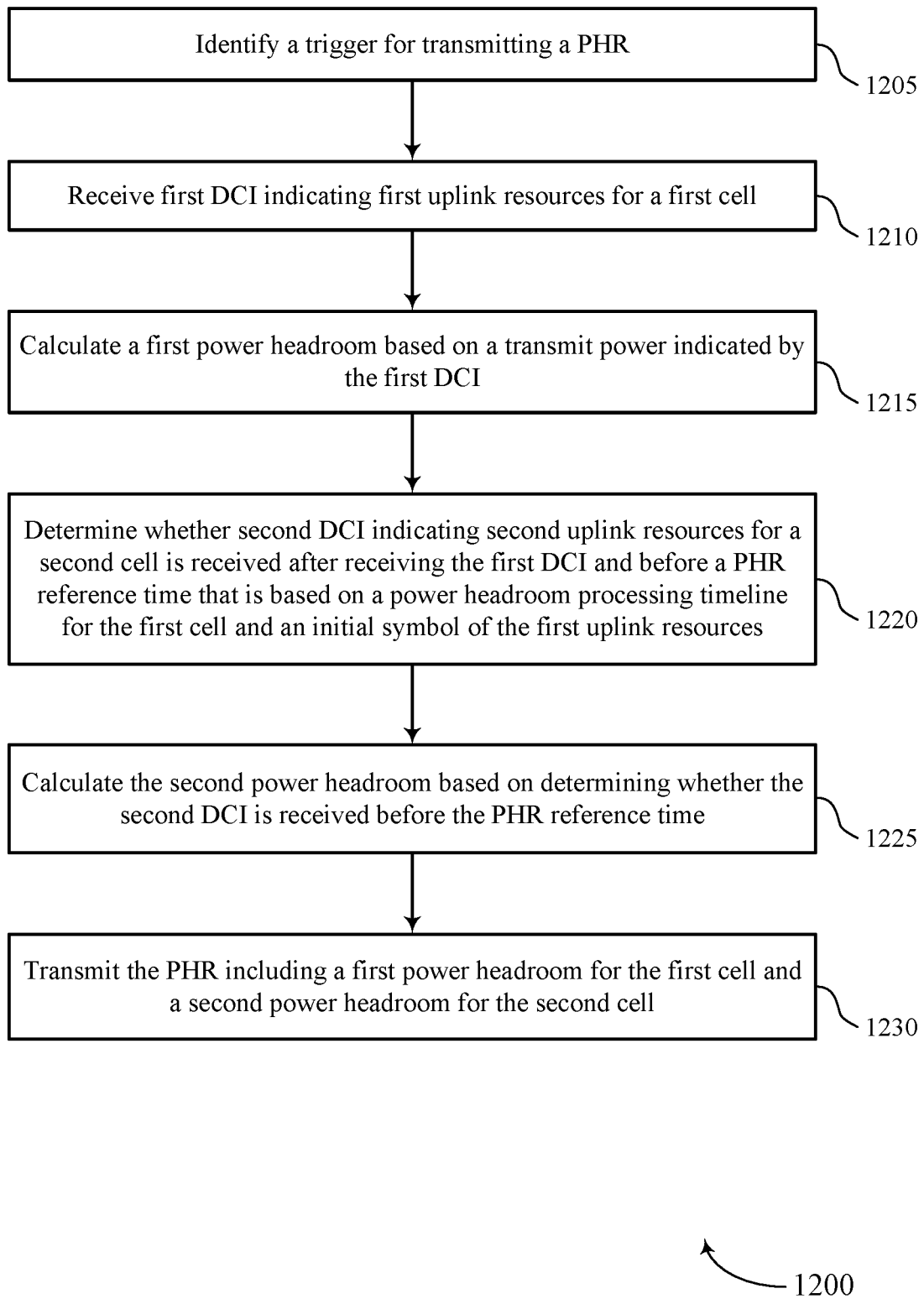

FIG. 12 shows a flowchart illustrating a method 1200 that supports a power headroom reporting procedure for multiple cells in accordance with aspects of the present disclosure. The operations of method 1200 may be implemented by a UE 115 or its components as described herein. For example, the operations of method 1200 may be performed by a power headroom reporting module as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may identify a trigger for transmitting a PHR. The operations of 1205 may be performed according to the methods described herein. In some examples, aspects of the operations of 1205 may be performed by a triggering component as described with reference to FIGS. 7 through 10.

At 1210, the UE may receive first DCI indicating first uplink resources for a first cell. The operations of 1210 may be performed according to the methods described herein. In some examples, aspects of the operations of 1210 may be performed by a DCI reception component as described with reference to FIGS. 7 through 10.

At 1215, the UE may calculate a first power headroom based on a transmit power indicated by the first DCI, where the PHR is based on calculating the first power headroom. The operations of 1215 may be performed according to the methods described herein. In some examples, aspects of the operations of 1215 may be performed by a power headroom calculation component as described with reference to FIGS. 7 through 10.

At 1220, the UE may determine whether second DCI indicating second uplink resources for a second cell is received after receiving the first DCI and before the first uplink resources. For example, the UE may determine whether the second DCI is received before a PHR reference time that is based on a power headroom processing timeline for the first cell and an initial symbol of the first uplink resources. The operations of 1220 may be performed according to the methods described herein. In some examples, aspects of the operations of 1220 may be performed by a processing determination component as described with reference to FIGS. 7 through 10.

At 1225, the UE may calculate the second power headroom based on determining whether the second DCI is received before the PHR reference time, where the PHR is based on calculating the second power headroom. The operations of 1225 may be performed according to the methods described herein. In some examples, aspects of the operations of 1225 may be performed by a power headroom calculation component as described with reference to FIGS. 7 through 10.

At 1230, the UE may transmit the PHR including a first power headroom for the first cell and a second power headroom for the second cell, where the PHR is based on the determining. The operations of 1230 may be performed according to the methods described herein. In some examples, aspects of the operations of 1230 may be performed by a PHR component as described with reference to FIGS. 7 through 10.

Figure 13:
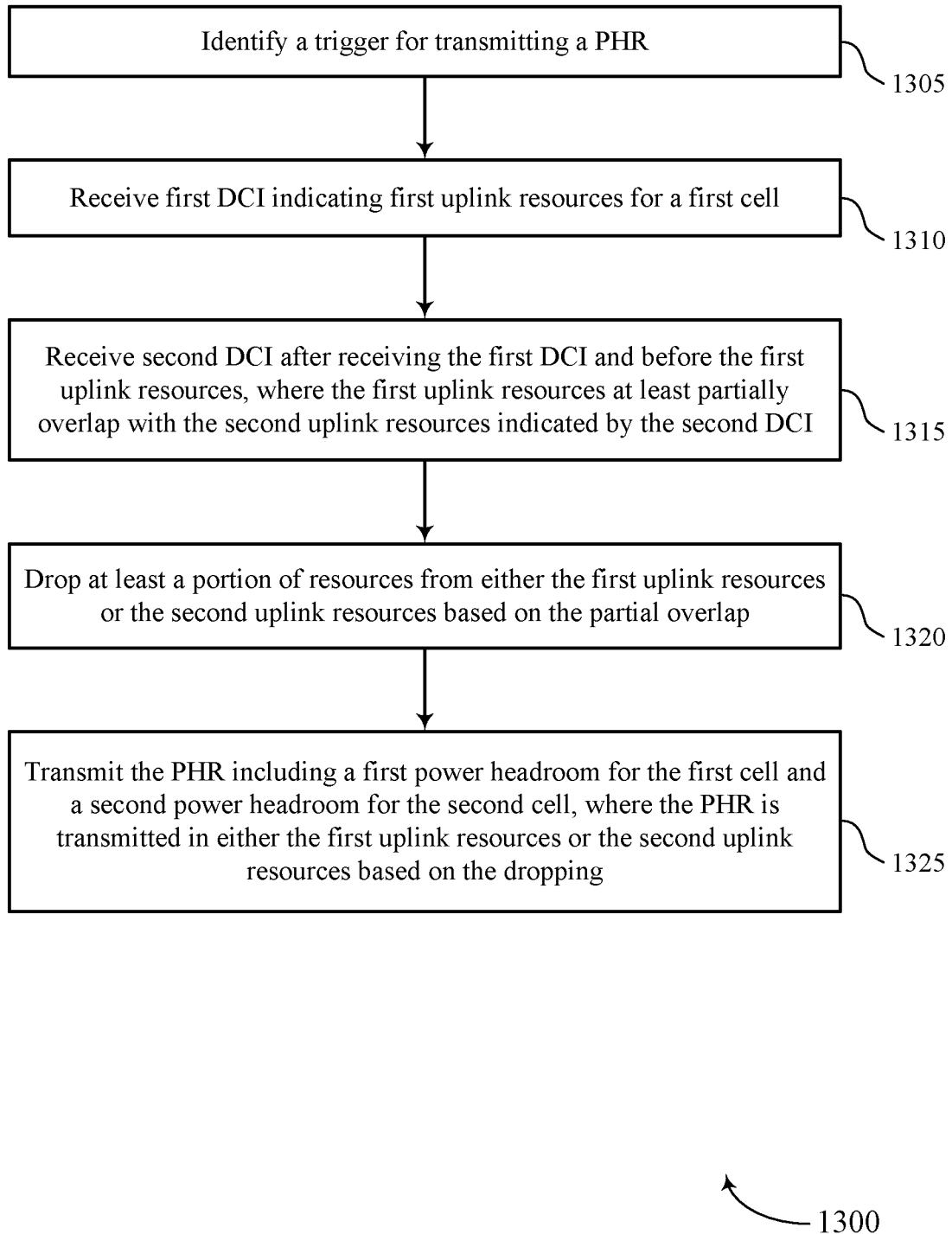

FIG. 13 shows a flowchart illustrating a method 1300 that supports a power headroom reporting procedure for multiple cells in accordance with aspects of the present disclosure. The operations of method 1300 may be implemented by a UE 115 or its components as described herein. For example, the operations of method 1300 may be performed by a power headroom reporting module as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may identify a trigger for transmitting a PHR. The operations of 1305 may be performed according to the methods described herein. In some examples, aspects of the operations of 1305 may be performed by a triggering component as described with reference to FIGS. 7 through 10.

At 1310, the UE may receive first DCI indicating first uplink resources for a first cell. The operations of 1310 may be performed according to the methods described herein. In some examples, aspects of the operations of 1310 may be performed by a DCI reception component as described with reference to FIGS. 7 through 10.

At 1315, the UE may receive second DCI after receiving the first DCI and before the first uplink resources, where the first uplink resources at least partially overlap with second uplink resources indicated by the second DCI. In some cases, the UE may determine that the second DCI is received after receiving the first DCI and before the first uplink resources. The operations of 1315 may be performed according to the methods described herein. In some examples, aspects of the operations of 1315 may be performed by a DCI reception component as described with reference to FIGS. 7 through 10.

At 1320, the UE may drop at least a portion of resources from either the first uplink resources or the second uplink resources based on the partial overlap, where the PHR is transmitted in either the first uplink resources or the second uplink resources based on the dropping. The operations of 1320 may be performed according to the methods described herein. In some examples, aspects of the operations of 1320 may be performed by a resource dropping component as described with reference to FIGS. 7 through 10.

At 1325, the UE may transmit the PHR including a first power headroom for the first cell and a second power headroom for the second cell, where the PHR is based on the determining. The operations of 1325 may be performed according to the methods described herein. In some examples, aspects of the operations of 1325 may be performed by a PHR component as described with reference to FIGS. 7 through 10.

Figure 14:
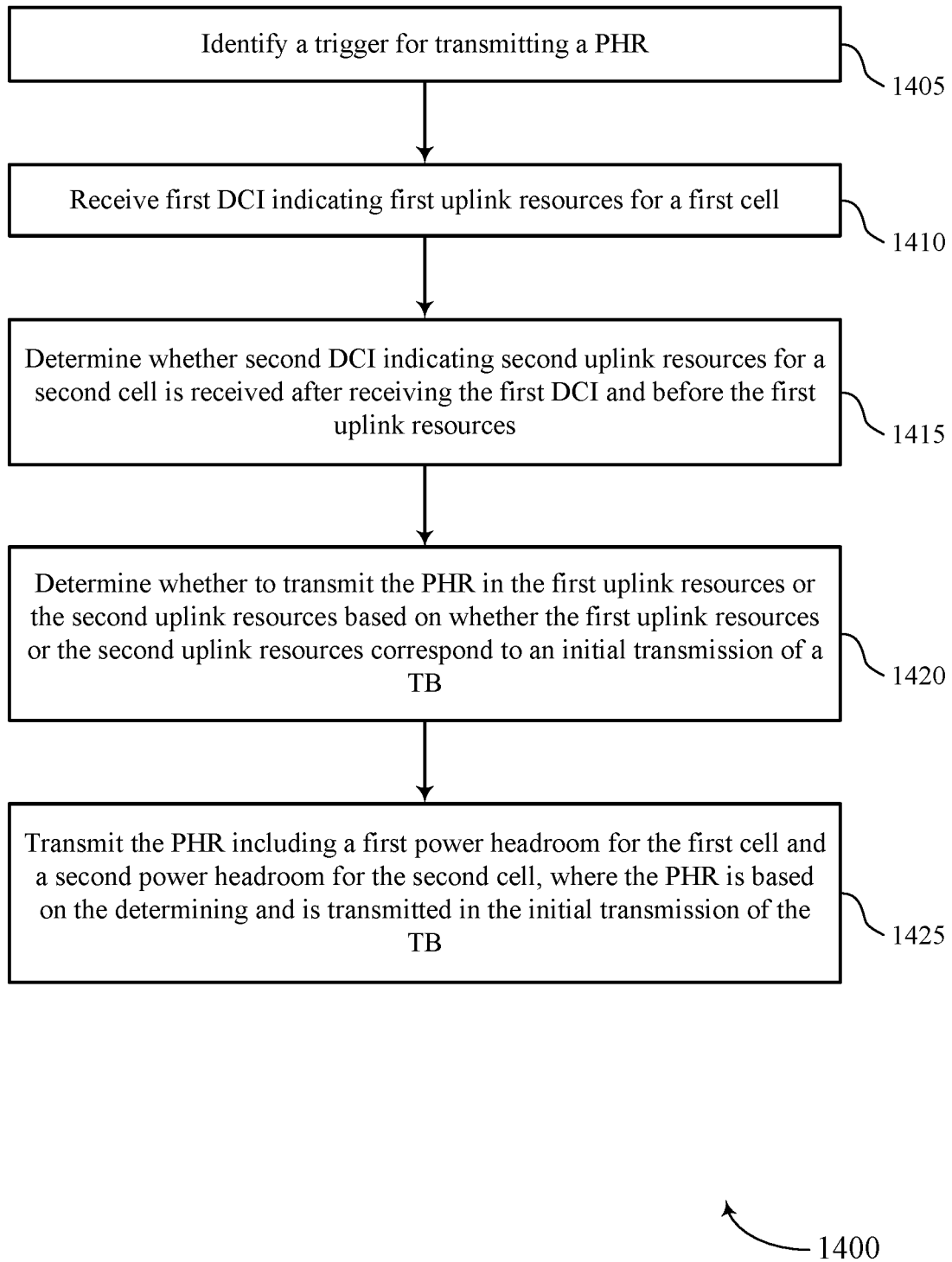

FIG. 14 shows a flowchart illustrating a method 1400 that supports a power headroom reporting procedure for multiple cells in accordance with aspects of the present disclosure. The operations of method 1400 may be implemented by a UE 115 or its components as described herein. For example, the operations of method 1400 may be performed by a power headroom reporting module as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may identify a trigger for transmitting a PHR. The operations of 1405 may be performed according to the methods described herein. In some examples, aspects of the operations of 1405 may be performed by a triggering component as described with reference to FIGS. 7 through 10.

At 1410, the UE may receive first DCI indicating first uplink resources for a first cell. The operations of 1410 may be performed according to the methods described herein. In some examples, aspects of the operations of 1410 may be performed by a DCI reception component as described with reference to FIGS. 7 through 10.

At 1415, the UE may determine whether second DCI indicating second uplink resources for a second cell is received after receiving the first DCI and before the first uplink resources. The operations of 1415 may be performed according to the methods described herein. In some examples, aspects of the operations of 1415 may be performed by a processing determination component as described with reference to FIGS. 7 through 10.

At 1420, the UE may determine whether to transmit the PHR in the first uplink resources or the second uplink resources based on whether the first uplink resources or the second uplink resources correspond to an initial transmission of a TB. The operations of 1420 may be performed according to the methods described herein. In some examples, aspects of the operations of 1420 may be performed by an initial TB transmission component as described with reference to FIGS. 7 through 10.

At 1425, the UE may transmit the PHR including a first power headroom for the first cell and a second power headroom for the second cell, where the PHR is based on the determining and is transmitted in the initial transmission of the TB. The operations of 1425 may be performed according to the methods described herein. In some examples, aspects of the operations of 1425 may be performed by a PHR component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   identifying a trigger for transmitting a power headroom report;
   receiving first downlink control information indicating first uplink resources for a first cell;
   determining whether second downlink control information indicating second uplink resources for a second cell is received after receiving the first downlink control information and before a power headroom report reference time indicating a threshold amount of time preceding the first uplink resources, wherein the power headroom report reference time is based at least in part on a processing capability of the UE and a first symbol of the first uplink resources; and transmitting the power headroom report comprising a first power headroom for the first cell and a second power headroom for the second cell, wherein the power headroom report is based at least in part on the determining.

2. The method of claim 1, further comprising:

calculating the first power headroom based at least in part on a transmit power indicated by the first downlink control information, wherein the power headroom report is based at least in part on calculating the first power headroom.

3. The method of claim 1, wherein the power headroom report reference time is based at least in part on a power headroom processing timeline for the first cell and an initial symbol of the first uplink resources, the method further comprising:

calculating the second power headroom based at least in part on the determining whether the second downlink control information is received before the power headroom report reference time, wherein the power headroom report is based at least in part on calculating the second power headroom.

4. The method of claim 3, further comprising:

receiving the second downlink control information after receiving the first downlink control information and before the power headroom report reference time; and calculating the second power headroom based at least in part on a transmit power indicated by the second downlink control information, wherein the power headroom report is based at least in part on calculating the second power headroom.

5. The method of claim 3, further comprising:

determining that the second downlink control information is not received after the first downlink control information and before the power headroom report reference time, wherein calculating the second power headroom is based at least in part on determining that the second downlink control information is not received.

6. The method of claim 5, further comprising:

calculating the second power headroom using a virtual calculation that is based at least in part on one or more pre-configured parameters, one or more parameters indicated by the first downlink control information, or a combination thereof, wherein the power headroom report is based at least in part on calculating the second power headroom.

7. The method of claim 5, further comprising:

calculating the second power headroom based at least in part on a transmit power for previous uplink resources for the second cell, wherein the previous uplink resources were scheduled before receiving the first downlink control information, and wherein the power headroom report is based at least in part on calculating the second power headroom.

8. The method of claim 5, further comprising:

calculating the second power headroom based at least in part on a transmit power for a previous grant-free uplink opportunity or a next grant-free uplink opportunity for the second cell, wherein the previous grant-free uplink opportunity was scheduled before receiving the first downlink control information and the next grant-free uplink opportunity is scheduled after receiving the first downlink control information, and wherein the power headroom report is based at least in part on calculating the second power headroom.

9. The method of claim 5, further comprising:

receiving the second downlink control information after the power headroom report reference time, wherein determining that the second downlink control information is not received after the first downlink control information and before the power headroom report reference time is based at least in part on receiving the second downlink control information after the power headroom report reference time.

10. The method of claim 3, wherein the power headroom processing timeline for the first cell is based at least in part on a UE processing capability for the first cell, a subcarrier spacing for the first cell, or a combination thereof.

11. The method of claim 10, further comprising:

transmitting a report indicating the UE processing capability for the first cell, the subcarrier spacing for the first cell, or a combination thereof.

12. The method of claim 1, further comprising:

receiving the second downlink control information after receiving the first downlink control information and before the first uplink resources, wherein the first uplink resources at least partially overlap with the second uplink resources indicated by the second downlink control information; and dropping at least a portion of resources from either the first uplink resources or the second uplink resources based at least in part on the partial overlap, wherein the power headroom report is transmitted in either the first uplink resources or the second uplink resources based at least in part on the dropping.

13. The method of claim 12, wherein a first priority value for the first uplink resources is different than a second priority value for the second uplink resources, the method further comprising:

determining whether to drop the portion of resources from the first uplink resources or the second uplink resources based at least in part on at least one of the first priority value or the second priority value, wherein the portion of resources is dropped from the first uplink resources if the first priority value is less than the second priority value and the portion of resources is dropped from the second uplink resources if the first priority value is greater than the second priority value.

14. The method of claim 12, wherein a first priority value for the first uplink resources is equal to a second priority value for the second uplink resources, the method further comprising:

determining whether to drop the portion of resources from the first uplink resources or the second uplink resources based at least in part on a pre-configuration, wherein dropping at least the portion of resources from either the first uplink resources or the second uplink resources is based at least in part on determining whether to drop the portion of resources from the first uplink resources or the second uplink resources.

15. The method of claim 12, wherein the power headroom report is transmitted in the second uplink resources based at least in part on the dropping, the method further comprising:

calculating the first power headroom based at least in part on a transmit power indicated by the first downlink control information; and calculating the second power headroom based at least in part on a transmit power indicated by the second downlink control information.

16. The method of claim 12, wherein the power headroom report is transmitted in the second uplink resources based at least in part on the dropping, the method further comprising:

calculating the first power headroom using a virtual calculation, wherein the virtual calculation is based at least in part on one or more pre-configured parameters, one or more parameters indicated by the second downlink control information, or a combination thereof; and
calculating the second power headroom based at least in part on a transmit power indicated by the second downlink control information.

17. The method of claim 12, wherein the power headroom report is transmitted in the second uplink resources based at least in part on the dropping, the method further comprising:
determining whether to re-calculate the first power headroom based at least in part on a power headroom processing timeline for the first cell and an initial symbol of the second uplink resources.

18. The method of claim 1, wherein transmitting the power headroom report comprises:
transmitting the power headroom report in an initial transmission of a transport block.

19. The method of claim 18, further comprising:
determining whether to transmit the power headroom report in the first uplink resources or the second uplink resources based at least in part on whether the first uplink resources or the second uplink resources correspond to the initial transmission of the transport block.

20. The method of claim 18, wherein the first uplink resources and the second uplink resources correspond to re-transmissions of transport blocks, and wherein transmitting the power headroom report comprises:
transmitting the power headroom report in third uplink resources corresponding to the initial transmission of the transport block.

21. The method of claim 1, wherein identifying the trigger for transmitting the power headroom report comprises:
identifying that a power headroom report prohibit timer has expired; and
determining that a current path loss for at least one cell differs from a reference path loss for the at least one cell by more than a path loss change threshold, wherein the reference path loss corresponds to a most recent power headroom report transmission for the at least one cell.

22. The method of claim 1, wherein identifying the trigger for transmitting the power headroom report comprises:
identifying that a power headroom report periodic timer has expired.

23. The method of claim 1, further comprising:
maintaining the identified trigger upon receiving the first downlink control information; and
canceling the identified trigger based at least in part on transmitting the power headroom report.

24. The method of claim 23, further comprising:
starting a power headroom report prohibit timer upon cancelling the identified trigger.

25. The method of claim 1, wherein the first cell corresponds to a first processing timeline and the second cell corresponds to a second processing timeline that is shorter than the first processing timeline.

26. An apparatus for wireless communications by a user equipment (UE), comprising:
a processor;
memory in electronic communication with the processor; and
instructions stored in the memory and executable by the processor to cause the apparatus to:
identify a trigger for transmitting a power headroom report;
receive first downlink control information indicating first uplink resources for a first cell;
determine whether second downlink control information indicating second uplink resources for a second cell is received after receiving the first downlink control information and before a power headroom report reference time indicating a threshold amount of time preceding the first uplink resources, wherein the power headroom report reference time is based at least in part on a processing capability of the UE and a first symbol of the first uplink resources; and
transmit the power headroom report comprising a first power headroom for the first cell and a second power headroom for the second cell, wherein the power headroom report is based at least in part on the determining.

27. The apparatus of claim 26,
wherein the power headroom report reference time is based at least in part on a power headroom processing timeline for the first cell and an initial symbol of the first uplink resources, wherein the instructions are further executable by the processor to cause the apparatus to:
calculate the second power headroom based at least in part on the determining whether the second downlink control information is received before the power headroom report reference time, wherein the power headroom report is based at least in part on calculating the second power headroom.

28. The apparatus of claim 26, wherein the instructions are further executable by the processor to cause the apparatus to:
receive the second downlink control information after receiving the first downlink control information and before the first uplink resources, wherein the first uplink resources at least partially overlap with the second uplink resources indicated by the second downlink control information; and
drop at least a portion of resources from either the first uplink resources or the second uplink resources based at least in part on the partial overlap, wherein the power headroom report is transmitted in either the first uplink resources or the second uplink resources based at least in part on the dropping.

29. An apparatus for wireless communications by a user equipment (UE), comprising:
means for identifying a trigger for transmitting a power headroom report;
means for receiving first downlink control information indicating first uplink resources for a first cell;
means for determining whether second downlink control information indicating second uplink resources for a second cell is received after receiving the first downlink control information and before a power headroom report reference time indicating a threshold amount of time preceding the first uplink resources, wherein the power headroom report reference time is based at least in part on a processing capability of the UE and a first symbol of the first uplink resources; and
means for transmitting the power headroom report comprising a first power headroom for the first cell and a second power headroom for the second cell, wherein the power headroom report is based at least in part on the determining.

30. A non-transitory computer-readable medium storing code for wireless communications by a user equipment (UE), the code comprising instructions executable by a processor to:
- identify a trigger for transmitting a power headroom report;
- receive first downlink control information indicating first uplink resources for a first cell;
- determine whether second downlink control information indicating second uplink resources for a second cell is received after receiving the first downlink control information and before a power headroom report reference time indicating a threshold amount of time preceding the first uplink resources, wherein the power headroom report reference time is based at least in part on a processing capability of the UE and a first symbol of the first uplink resources; and
- transmit the power headroom report comprising a first power headroom for the first cell and a second power headroom for the second cell, wherein the power headroom report is based at least in part on the determining.

* * * * *